United States Patent [19]

Sakakibara et al.

[11] Patent Number: 5,005,442
[45] Date of Patent: Apr. 9, 1991

[54] CONTROL SYSTEM FOR STEPLESS BELT TRANSMISSIONS

[75] Inventors: Shiro Sakakibara; Norio Imai; Hidehiro Kondo; Kazuo Kamiya, all of Anjo, Japan

[73] Assignee: Aisin AW Co., Ltd., Anjo, Japan

[21] Appl. No.: 281,352

[22] Filed: Dec. 8, 1988

[30] Foreign Application Priority Data

| Dec. 11, 1987 | [JP] | Japan | 62-313257 |
| Dec. 28, 1987 | [JP] | Japan | 62-333032 |
| Dec. 28, 1987 | [JP] | Japan | 62-333033 |
| Dec. 28, 1987 | [JP] | Japan | 62-333034 |
| Dec. 28, 1987 | [JP] | Japan | 62-333035 |
| Dec. 28, 1987 | [JP] | Japan | 62-333036 |

[51] Int. Cl.$^5$ .................................. B60K 41/12
[52] U.S. Cl. ............................ 74/866; 74/867
[58] Field of Search ............... 74/867, 868, 866, 689

[56] References Cited

U.S. PATENT DOCUMENTS

| 4,433,594 | 2/1984 | Smirl | 74/689 |
| 4,603,602 | 8/1986 | Tanaka et al. | 74/866 |
| 4,608,885 | 9/1986 | Koivunen | 74/689 |
| 4,672,863 | 6/1987 | Itoh et al. | 74/866 |
| 4,735,598 | 4/1988 | Moroto et al. | 474/29 |
| 4,747,327 | 3/1988 | Itoh et al. | 74/868 |
| 4,793,217 | 12/1988 | Morisawa et al. | 74/867 X |
| 4,796,489 | 1/1989 | Nagamatsu et al. | 74/868 |
| 4,803,899 | 2/1989 | Kumura | 74/866 |
| 4,823,267 | 4/1989 | Kumura | 74/866 X |

FOREIGN PATENT DOCUMENTS

| 59-212566 | 12/1984 | Japan . |
| 61-31752 | 2/1986 | Japan . |
| 62-166120 | 7/1987 | Japan . |
| 63-266266 | 11/1988 | Japan . |

Primary Examiner—Dwight Diehl
Attorney, Agent, or Firm—Varndell Legal Group

[57] ABSTRACT

A stepless transmission in which travel in two different shift regions is made possible by a main transmission unit constituting a stepless transmission mechanism and an auxiliary transmission unit coupled to the stepless transmission mechanism, and in which torque ratio is capable of being varied steplessly in response to signals indicative of detected vehicle traveling conditions. The transmission is equipped with a function which improves the feeling of a speed reduction, makes possible a smooth start and provides excellent accelerability, a function which assures that the vehicle will start moving forward reliably, a function which enhances brake durability, and a function enhances safety in the event of motor malfunction.

6 Claims, 29 Drawing Sheets

FIG. 3

| | CLUTCH & BRAKE | | | | | O.W. | SOLENOID | | |
|---|---|---|---|---|---|---|---|---|---|
| | C1 | C2 | CL | B1 | B2 | F | NO.1 | NO.2 | NO.3 |
| P | | | | | | | ○ | ○ | |
| R | | | | ○ | ○ | | | ○ | |
| N | | | | | | | ○ | ○ | |
| D L | ○ | | ◎ | | | ○ | | ○ | ◎ |
| D H | ○ | ○ | ◎ | | | | | | ◎ |
| S2 L | ○ | | ◎ | ○ | | ○ | | ○ | ◎ |
| S2 H | ○ | ○ | ◎ | | | | | | ◎ |
| S1 L | ○ | | ◎ | ○ | | ○ | | ○ | ◎ |
| S1 H | ○ | ○ | ◎ | | | | | | ◎ |

◎ ACTUATED AT LOCK-UP

FIG.12

|  | NO. 1 | NO. 2 | NO. 3 |
|---|---|---|---|
| P → R | ○ B2 | | |
| N → R | ○ B2 | | |
| N → D | ○ C1 | | |
| D  L → H | | ○ C2 | |
| D  H → L | | ○ C2 | |
| S  L → H | | ○ C2 | |
| S  H → L | | ○ B1 | |
| D → S (H → L) | | ○ B1 | |
| L - UP | | | ○ CL |

FIG. 22
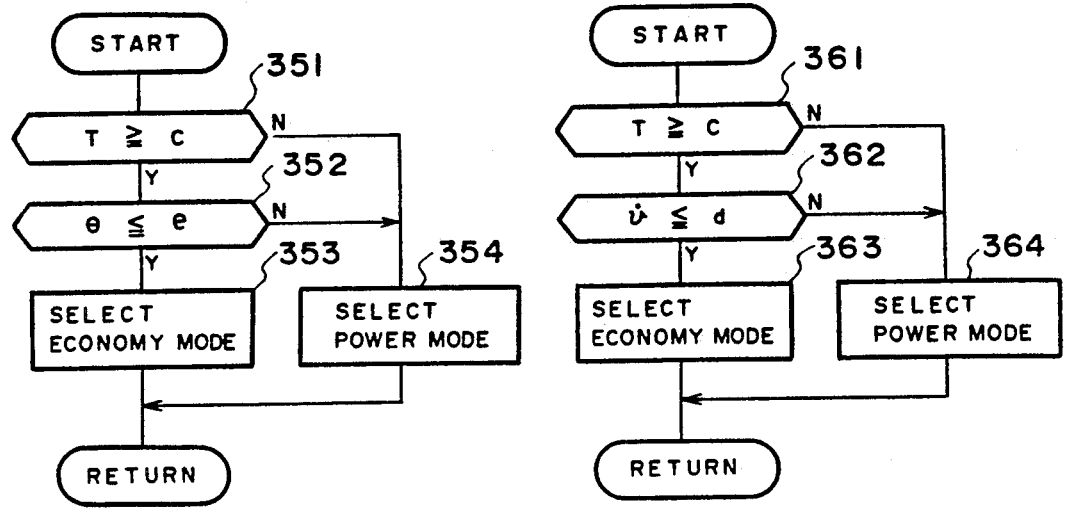
FIG. 23
FIG. 24
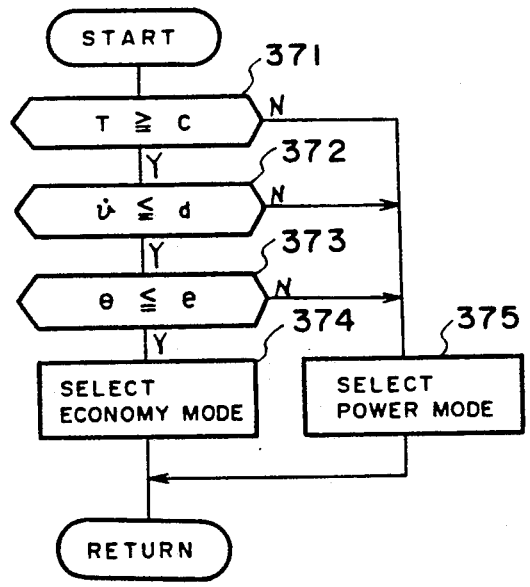

CONTROL SYSTEM FOR STEPLESS BELT TRANSMISSIONS

BACKGROUND OF THE INVENTION

This invention relates to a control system in a stepless transmission, especially the transmission of an automotive vehicle. More particularly, the invention relates to a control system used in controlling a stepless transmission of the type comprising, in combination, a stepless transmission unit using a belt (where the meaning of the term "belt" is taken to cover a chain) and an auxiliary transmission unit, such as a planetary gear unit, for widening the torque, ratio range.

Because of to the demand for improved fuel consumption in automotive vehicles, stepless transmissions which incorporate a stepless belt transmission unit (CVT) have become the focus of attention. In general, a stepless transmission is composed of a stepless belt transmission unit, a fluid coupling (or an electromagnetic powder clutch), a forward/reverse changeover unit, a speed reducing gear unit and a differential gear unit. As a consequence of such limitations as space and the minimum radius of curvature of the belt, the above-mentioned stepless belt transmission unit is incapable of providing a large torque ratio range. The requirements for improved fuel consumption and shifting performance in an automotive vehicle cannot be fully satisfied within this torque ratio range provided solely by the stepless belt transmission unit.

As set forth in the specification of Japanese Patent Application Laid-Open No. 61-31752, a stepless transmission has been proposed in which an auxiliary transmission unit comprising a Ravigneaux-type planetary gear mechanism is serially connected with a stepless belt transmission unit, and the auxiliary transmission unit is changed over between low- and high-speed stages to broaden the torque ratio range.

In this stepless transmission, switching the auxiliary transmission unit to the high- and low-speed stages is performed by shifting a shift lever to an L (low) range and a D (drive) range. The stepless transmission unit is suitably controlled so as to attain a target engine speed (rpm) decided by the vehicle speed and throttle opening. The target engine speed is set separately for each of the aforementioned shift positions, namely for the low-speed stage and high-speed stage of the auxiliary transmission unit.

However, since the auxiliary transmission unit is changed over to the low- and high-speed stages by operating the shift lever, the abovementioned stepless transmission is troublesome to manipulate and difficult to operate properly.

Accordingly, the applicant has previously proposed a stepless transmission control system (see Japanese Patent Application No. 62-99360, filed in Japan on Apr. 21, 1987) in which the stepless transmission unit and auxiliary transmission unit are suitably controlled, based on predetermined decisions, with respect to a target torque ratio decided by such traveling conditions as engine speed and throttle opening, whereby the auxiliary transmission unit is changed over to the low-speed mode and high-speed mode automatically.

When control is exercised to halt the vehicle, and in particular, when control is performed in accordance with an optimum fuel consumption characteristic in the abovementioned control system, control is carried out in such a manner that the target engine speed is reduced, thereby lowering the torque ratio, when the driver's foot is removed from the accelerator pedal. Furthermore, control is such that when coasting continues or the brake is operated, vehicle velocity decreases and torque ratio gradually rises, with the maximum torque ratio being attained when the vehicle comes to rest. This is necessary for the vehicle to start out smoothly the next time. In particular, to protect the belt in a stepless belt transmission unit, a shifting operation cannot be performed while the vehicle is at rest. Consequently, it is required that the stepless transmission unit be controlled so as to obtain a maximum torque ratio in a reliable manner.

In an arrangement wherein the auxiliary transmission unit is changed over such that operation in the high-speed mode is given precedence when the target torque ratio is in a region (see B in FIG. 36) where both the low- and high-speed modes can be achieved equally and in a region (see C in FIG. 36) where only the high-speed mode can be achieved, and such that operation in the low-speed mode is given precedence when the target torque ratio is in a region (see A in FIG. 36) where only the low-speed mode can be achieved, the stepless transmission unit is shifted down (see arrow E in FIG. 36), so that the unit attains the maximum torque ratio, when the high-speed mode is in effect at the time control is executed to stop the vehicle. After the maximum torque ratio is achieved, the auxiliary transmission unit is changed over to the low-speed mode, and the stepless transmission unit is upshifted (see arrow F in FIG. 36) in order that its torque ratio will approach the maximum torque ratio of the high-speed mode. Thereafter, the stepless transmission unit is downshifted as vehicle speed declines.

However, when the auxiliary transmission unit is changed over from the high-speed mode to the low-speed mode, the stepless transmission unit is upshifted and then the vehicle is suddenly reduced in speed and stopped by applying the brake, there is the danger that the downshift of the stepless transmission unit will not occur in time so that the maximum torque ratio will not be achieved when the vehicle stops. When this phenomenon occurs, there is not enough torque when the vehicle is propelled forward the next time; hence, performance at start-off declines.

Accordingly, in the previously filed application mentioned above, a target torque ratio a of the overall stepless transmission is set, a mode changeover means is changed over in such a manner that the high-speed mode H operates when the set target torque ratio is in the region B, where both the low-speed mode L and high speed-mode H can be achieved equally, and such that the low-speed mode L operates when the set target ratio is in the region A. Here the stepless transmission unit is held at a maximum torque ratio $a_H$max, without effecting a changeover from the high-speed mode H to the low-speed mode L, while the stepless transmission unit is upshifted (see arrow F) from the maximum torque ratio $a_H$max of the high-speed mode H.

In this control system, however, even if the target torque ratio at the time of deceleration is a torque ratio in which only the L mode is attained, a changeover to the L mode must be made if the accelerator pedal is depressed when a shift to the L mode is being halted. At this time there is a rapid change in torque ratio which detracts from the feeling of smooth travel. On the other hand, if the changeover from the H mode to the L mode is delayed, a low torque ratio will be established. As a result, no driving force will be obtained or knocking will occur.

In a conventional control system as disclosed, for example, in Japanese Patent Application Laid-Open No. 59-212566, the shifting speed of a stepless transmission mechanism is set to a larger value, in dependence upon vehicle speed, the greater the throttle opening of the intake system or the greater the rate of change in throttle opening with time, thereby making it possible to prevent a deterioration in accelerability and fuel efficiency. In this control system, however, there is no change in throttle at a throttle opening $\theta i$ of $\theta min \geq \theta i$ (where $\theta min$ is the minimum set value of throttle opening), so that the shifting speed at the time of coasting is set to a minimum value. Though shifting speed is satisfactory with regard to a change in target torque ratio accompanying a decrease in vehicle speed, a downshift cannot catch up with a sudden change in target torque ratio when the brake is suddenly applied, and there is the possibility that the belt of the stepless transmission mechanism will not downshift completely when the vehicle comes to rest.

In a stepless transmission proposed in Japanese Patent Application Laid-Open No. 62-13853 as shown in FIG. 35, the rotation of a motor operatively associated with a worm gear 67 is controlled, based on vehicle travel signals indicative of vehicle speed, throttle opening, engine speed and the like, when a shift is made. For example, when the worm gear 67 is rotated in the upshift direction (clockwise in FIG. 35), a worm wheel 66 rotates in the clockwise direction as seen from the right side of the drawing (directions of rotation will be as seen from the right side of the drawing hereinafter) so that gears 61, 62, 63, 65 are also rotated in the same direction via a counter shaft 57. When this occurs, gears 26, 27 of a ball screw mechanism 21 on the primary side rotate counterclockwise. Based on a difference in the number of teeth, the rotational speed of the small-diameter gear 27 is greater than that of the large-diameter gear 26. Consequently, a male screw portion 23 that rotates together with the gear 27 via a ball spline 29 undergoes greater rotation than a female screw portion 22 that co-rotates with the gear 26. A ball screw, which comprises a right-handed screw, is caused to extend in the rightward direction so that a movable sheave 7 is moved via a thrust bearing 31 so as to reduce the gap between itself and a stationary sheave 9, thereby enlarging the effective diameter of a belt B. Similarly, with regard to gears 49, 47 of a ball screw mechanism 50 on the secondary side relying upon gears 63, 65, a male screw portion 46 that co-rotates with the gear 49 undergoes greater rotation than a female screw portion 45 that co-rotates with the gear 47 based on the relative rotation in the counterclockwise direction. As a result, a ball screw comprising a right-handed screw is withdrawn in the rightward direction to move a movable sheave 33 so as to reduce a gap between it and a stationary sheave 35, thereby reducing the effective diameter of the belt B.

In this conventional stepless transmission, however, a speed reduction from a motor serving as the shift actuator is made at the worm gear, which has a poor transfer efficiency. Consequently, a motor of a fairly large capacity relative to the actual load capacity is required. In addition, in a case where a combination of a high-efficiency spur gear and brake is employed instead of the worm gear, there is a possibility that the next shift command will arrive as soon as a speed change in the stepless transmission ends, so that it is difficult to make a decision regarding application of the brake. In other words, if the brake were to be frequently applied every time a shift ends, the durability of the brake would suffer.

In accordance with another control system, the gear ratio is subjected to downshift or upshift control, based on a preset shift control characteristic, in such a manner that the input rotational speed is made to correspond to the engine throttle opening. By virtue of this control, the engine is operated at a constant torque and constant output, output is increased and fuel is consumed more efficiently. Also, in Japanese Patent Application Laid-Open No. 62-166120, a system is disclosed in which, when a vehicle is decelerated, the control gain of downshift control with regard to the gear ratio of the vehicle is revised to be larger than what prevails normally, thereby raising control speed in the downshift region of the gear ratio and enhancing the engine braking effect at deceleration of the vehicle. At subsequent re-acceleration, a response delay is eliminated by an enlarged torque transfer ratio, there raising acceleration response.

However, when it is attempted to suddenly decelerate and stop the vehicle by an operation such as sudden braking, a problem that arises is that the downshift of the stepless transmission mechanism is not in time and the mechanism is fixed at an intermediate torque ratio with respect to the maximum torque ratio. When it is attempted to start the vehicle moving forward again in such case, the maximum torque ratio is not achieved, as a result of which the stepless transmission mechanism undergoes a violent downshift at forward motion of the vehicle. Consequently, forward motion of the car is accompanied by a shock.

In the stepless transmission proposed in the aforementioned Japanese Patent Application Laid-Open No. 62-13853, rotation of the motor coupled to the worm gear is controlled based on vehicle travel signals indicative of vehicle speed, throttle opening and engine rpm at the time the transmission is shifted. In this stepless transmission, however, the stepless transmission mechanism will downshift and, in some cases, overrun, if the accelerator pedal is depressed when the motor or the driver controlling the motor malfunctions to place the motor in an uncontrollable (free) or runaway state. On the other hand, if the accelerator pedal is suddenly released from an accelerator opening of $\theta$, the stepless transmission mechanism will undergo an upshift and it will not be possible to the vehicle to travel normally. If control of torque ratio thus becomes impossible, it is imperative that the torque ratio be fixed. However, in a stepless transmission mechanism, the target torque ratio frequently changes in response to throttle opening and the motor cannot immediately catch up with the target torque ratio. Consequently, there are instances in which there is a large deviation between a commanded value and a currently prevailing value, even when operation is normal.

SUMMARY OF THE INVENTION

Accordingly, a principal object of the invention is to enhance confort at the time of a speed reduction and obtain a smooth start and smooth acceleration.

The present invention, is directed to a stepless transmission in which travel in two different shift regions is made possible by a main transmission unit constituting a stepless transmission mechanism and an auxiliary transmission unit coupled to the stepless transmission mechanism, and torque ratio is capable of being varied steplessly in response to signals detecting vehicle traveling conditions, shifting of the stepless transmission mechanism is stopped and a neutral state is established if the shift regions are changed over at downcoasting of the vehicle. Accordingly, when the vehicle is downcoasting in the D range, comfort during the speed reduction is enhanced since shifting is stopped in the neutral state. Furthermore, since the torque ratio of the stepless transmission mechanism is the maximum torque ratio at a comparatively high vehicle speed when the vehicle is downcoasting, the maximum torque ratio is reliably attained even after the vehicle is suddenly stopped. This makes it possible for the vehicle to start off smoothly from rest. Further, if the accelerator pedal is depressed at downcoasting, it is possible to avoid loss of driving force or discomfort caused by a violent downshift. Thus, smooth accelerability is obtained.

Another object of the invention is to assure that a vehicle can be started moving forward again after the vehicle is stopped by stepping down on a brake.

To this end, the present invention includes in a stepless transmission in which torque ratio is capable of being varied steplessly by driving a motor in response to signals detecting vehicle traveling conditions, and means are provided for detecting a brake signal. When the brake signal is detected, shifting speed is set to a maximum value. If the brake signal is not detected, the shifting speed is set in accordance with the signals detecting the vehicle traveling conditions. In this way, a shift can be made to follow up a sudden change in target torque ratio caused by stepping down on the brake, and a shift can be completely terminated at an underdrive position when the vehicle is stopped. As a result, the belt torque ratio attains the maximum torque ratio when the vehicle is stopped, thus assuring that the vehicle will start moving forward in a positive fashion the next time.

Still another object of the invention is to make possible a reduction in motor capacity and to improve brake durability.

To this end, the present invention includes a stepless transmission in which torque ratio is capable of being varied steplessly by driving a motor in response to signals detecting vehicle traveling conditions, and a brake mechanism is provided for stopping the motor when the motor is deenergized and is actuated a predetermined period of time after a shift command is terminated. Accordingly, in a case where a shift command for a stepless transmission mechanism ends and there is no following shift command even upon passage of a fixed period of time, the brake is turned on and the motor is turned off to avoid frequent application of the brake and improve brake durability. Since the brake is applied after the motor has stopped rotating, the capacity of the brake can be reduced.

A further object of the invention is to enable a decision regarding whether or not the motor is uncontrollable to be made in reliable fashion, and to fix the torque ratio if it is decided that the motor is uncontrollable.

To this end, the present invention includes a control system for a stepless transmission in which torque ratio is capable of being varied steplessly by driving a motor in response to signals detecting vehicle traveling conditions, and error computing means is provided for computing an error between a target amount of motor movement decided by the vehicle traveling conditions, and feedback of the amount of motor movement, wherein if the error is outside a predetermined range and remains so in excess of a predetermined period of time, the motor brake is actuated to turn the motor off. In this way, a decision regarding whether or not the motor is uncontrollable can be made in reliable fashion. If the motor is found to be uncontrollable, the motor brake is actuated to fix the torque ratio. This eliminates problems during travel if the motor or the driver controlling the motor should happen to malfunction.

Yet another object of the invention is to make it possible for a vehicle to start out smoothly without shock when the vehicle is propelled forward after the V-belt has been stopped midway due to stopping of the vehicle by sudden braking or the like.

To this end, the present invention includes a stepless transmission in which shift speed is computed based on a function of a difference between a target input rotational speed, which is decided by vehicle traveling conditions, and a present input rotational speed, and a torque ratio is capable of being varied steplessly, a downshift is performed if a target torque ratio becomes larger than a present torque ratio in a case where the vehicle is propelled forward from rest after shifting of the stepless transmission mechanism is stopped in midcourse, the downshift being performed at a speed lower than that which prevails during an ordinary downshift. Thus, if the belt is stopped midway by sudden braking, the stepless transmission mechanism performs a downshift at a slow speed. Consequently, when the vehicle starts moving forward again, this can be accomplished smoothly without shock.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a view for describing the action of friction elements and solenoids in each shift range;

FIGS. 5 through 10 are views for describing the construction and operation of a hydraulic control apparatus according to the invention, in which FIG. 5 is a view of operation in an N range or P range, FIG. 6 is a view of operation when shifting from the N range to a D range, FIG. 7 is a view of operation when shifting from an L mode to an H mode in the D range, FIG. 8 is a view showing operation when lock-up is performed in the D range mode, FIG. 9 is a view showing operation when shifting between the L mode and H mode in the S range, and FIG. 10 is a view showing operation when shifting from the N range to the R range;

FIG. 12 is a view showing friction elements the duties of which are controlled in each shift range;

FIGS. 22 through 24 are flowcharts of acceleration request reset processing;

DESCRIPTION OF THE PREFERRED EMBODIMENT

An embodiment of the present invention will now be described with reference to the drawings.

Figure 1:
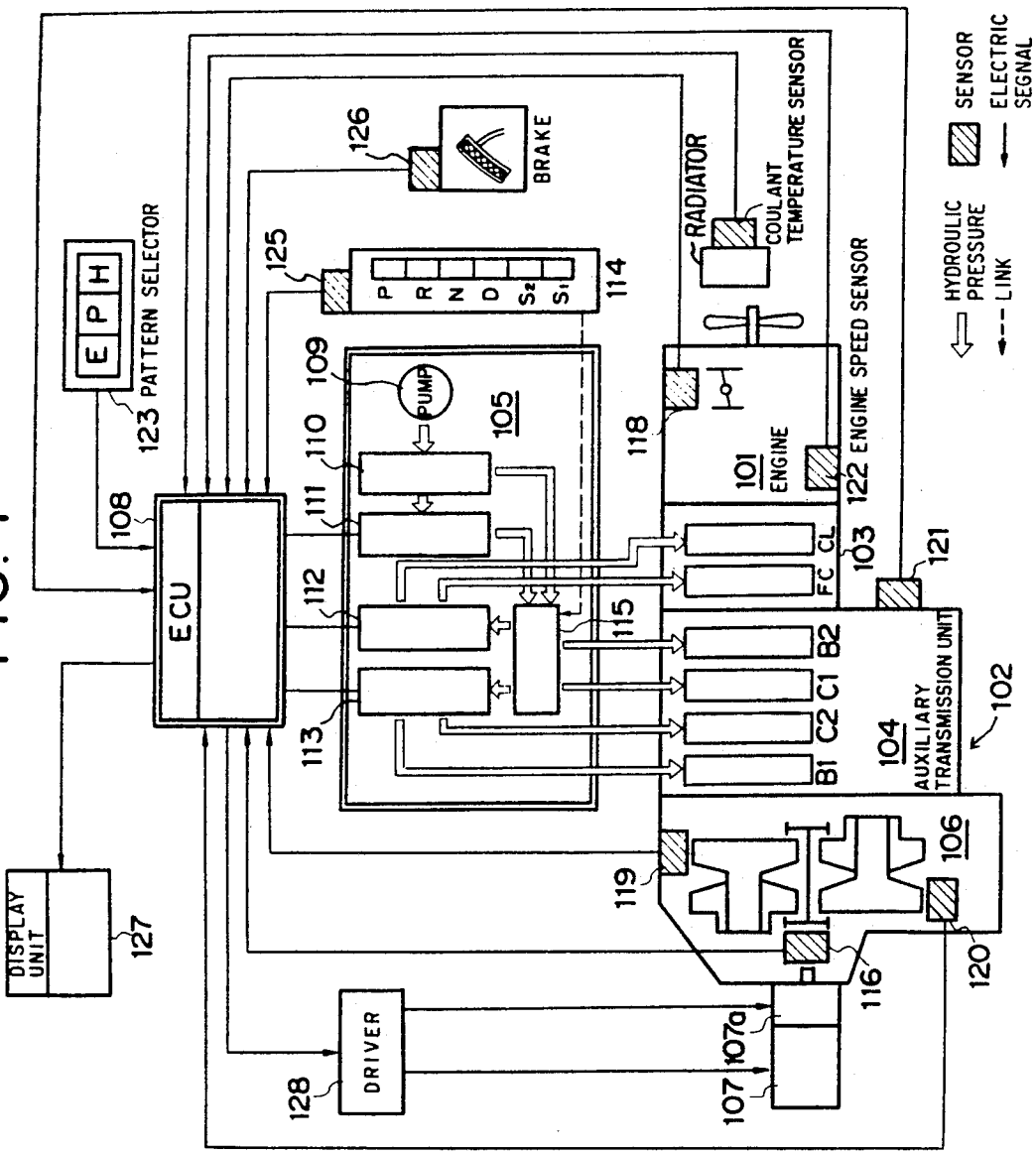
FIG. 1 is a view showing the overall arrangement of a stepless belt transmission control system according to the present invention.

FIG. 1 is a view showing the overall arrangement of a stepless belt transmission control system according to the present invention.

The arrangement shown in FIG. 1 comprises a stepless belt transmission 102 coupled to an engine 101, a hydraulic control unit 105 for controlling a starting device 103 and an auxiliary transmission unit 104 of the stepless transmission 102, a CVT shifting motor 107 for shifting a main transmission unit 106 constituting a stepless transmission mechanism, and an electronic control unit 108 for controlling the hydraulic control unit 105, the CVT shifting motor 107 and a brake 107a.

The hydraulic control unit 105 comprises a pump 109, a line pressure regulator 110, a shift pressure controller 111, a starting controller 112, an L-H changeover controller 113 and a speed selector 115 operated by a shift lever 114. A lock-up clutch CL, a fluid coupling FC, a reverse brake B2, a forward clutch C1, a high clutch C2 and a low-coast brake B1 are controlled in response to commands from the electronic control unit 108.

The electronic control unit 108 receives inputs from a motor rotation signal sensor 116, a throttle opening sensor 118, a primary sheave rotational speed sensor 119, a vehicle speed sensor 121, an engine speed sensor 122, a pattern selector 123, a shift position sensor 125, and a brake signal sensor 126. On the basis of these signals, decision processing is executed regarding shifting control, optimum fuel consumption control, maximum power control, engine braking control and L-H changeover control. The electronic control unit 108 delivers output signals to the hydraulic pressure control unit 105, CVT shifting motor 107 and a display unit 127. The pattern selector 123 is a switch for selecting an economy mode (E), a power mode (P) and high-mode starting (H).

Figure 2:
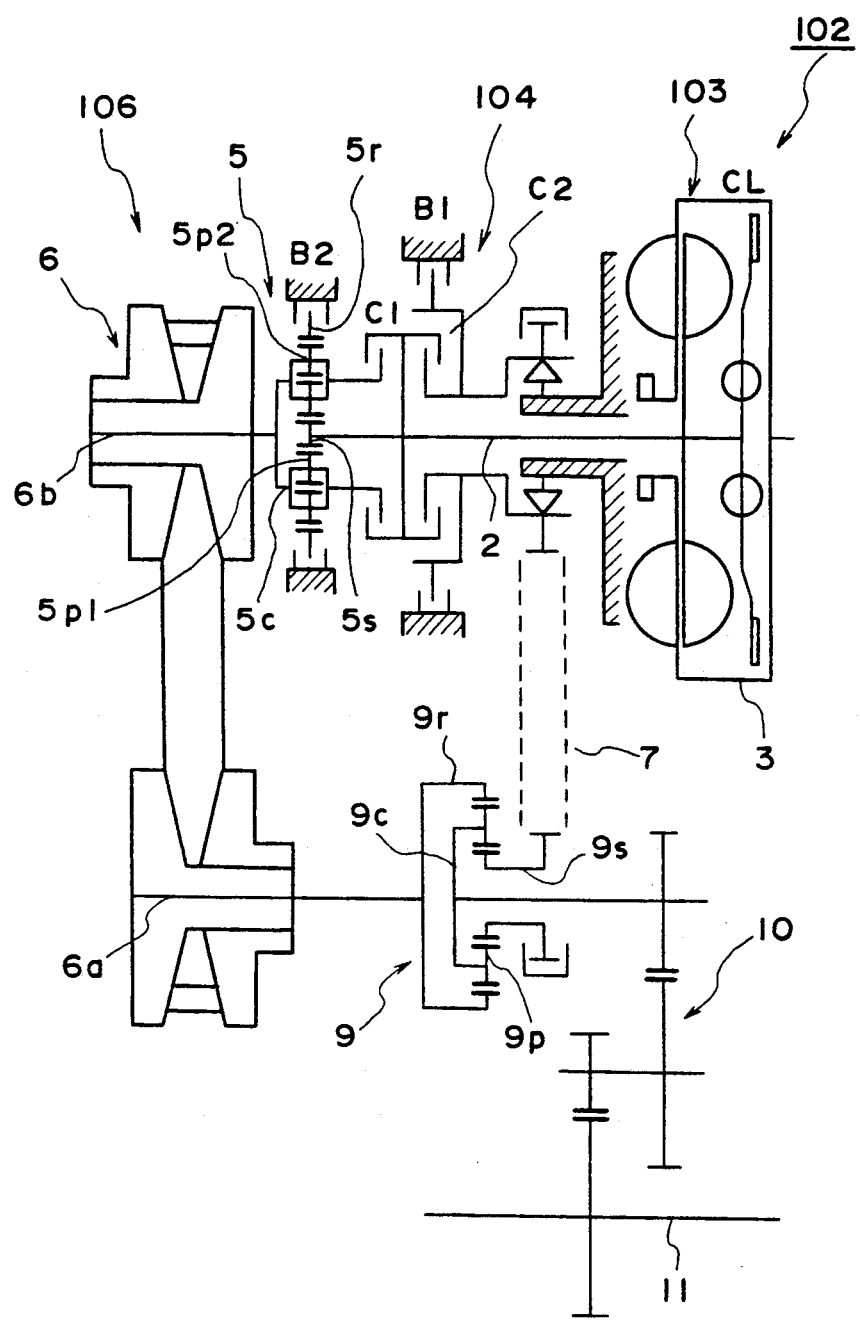
FIG. 2 is a schematic view if the transmission mechanism of the stepless belt transmission.

FIG. 2 is a schematic view showing the shifting mechanism of the stepless belt transmission 102. The stepless belt transmission 102 includes an input shaft 2, the starting unit 103, which has the lock-up clutch CL and fluid coupling 3, a dual planetary gear unit 5 constituting a forward/reverse changeover device, a stepless transmission mechanism 6 constituting the main transmission unit 106, a controller 104 constituting the auxiliary transmission unit, a transfer unit 7, a single planetary gear unit 9, an output member 10 and an axle shaft 11.

The dual planetary gear unit 5 has a sun gear 5s connected to the input shaft 2, a carrier 5c connected to a primary shaft 6b of the stepless transmission mechanism 6 and also to the input shaft 2 via the forward clutch Cl, and a ring gear 5r connected to the reverse brake B2. The carrier 5c supports a pinion 5pl meshing with the sun gear 5s and a pinion 5p2 meshing with the ring gear 5r, the pinions 5pl, 5p2 meshing with each other.

The single planetary gear unit 9 has a ring gear 9r operatively associated with a secondary shaft 6a of the stepless transmission mechanism 6, a carrier 9c operatively associated with the output member 10, and a sun gear 9s operatively associated with the one-way clutch F and low-coast reverse brake B1, which constitutes locking means, via the transfer unit 7, and connected to the input shaft 2 via the high clutch C2.

Each clutch, brake and one-way clutch in the stepless belt transmission constructed as set forth above operates as shown in FIG. 3 in each of the shift positions. The symbol "⊙" indicates that the lock-up clutch CL is capable of being actuated as the occasion may demand.

Operation will now be described in detail.

On the low-speed side L in the D range, the forward clutch C1 is engaged and the one-way clutch F is actuated. Under these conditions, rotation of the engine crankshaft is transmitted to the input shaft via the lock-up clutch CL or fluid coupling 3. Crankshaft rotation is also transmitted directly to the sun gear 5s of the dual planetary gear unit 5 and to the carrier 5c via the forward clutch C1. As a result, the dual planetary gear unit 5 co-rotates with the input shaft 2 and transmits forward rotation to the primary shaft 6b of the stepless transmission mechanism 6, and rotation subjected to a speed change by the stepless transmission 6 as the occasion demands is transmitted from the secondary shaft 6a to the ring gear 9r of the single planetary gear unit 9. Under these conditions, the sun gear 9s, which is a reaction force supporting element that receives a reaction force, is stopped by the one-way clutch F via the transfer unit 7. As a result, the rotation of the ring gear 9r is extracted from the carrier 9c as rotation of reduced speed. This rotation is reduced in speed further via the output member 10 and then transmitted to the axle shaft 11.

On the high-speed side H in the D range, the high clutch C2 is engaged in addition to the forward clutch C1. Under these conditions, and in a manner similar to that described above, rotation suitably changed in speed by the stepless transmission mechanism 6 is transmitted from the secondary shaft 6a to the ring gear 9r of the single planetary gear unit 9. On the other hand, the rotation of the input shaft 2 is simultaneously transmitted to the sun gear 9s of the single planetary gear unit 9 via high clutch C2 and transfer unit 7, whereby the torques of the ring gear 9r and carrier 9s are combined by the planetary gear unit 9 and outputted from the carrier 9c. A speed reduction takes place via the output member 10 before the torque is transmitted to the accelerator shaft 11.

Though a freed state is attained at engine braking based on the one-way clutch during operation in the D range, the low-coast reverse brake B1 is actuated in addition to the one-way clutch F in the S range so that power is transmitted when a reverse torque acts as well.

In the R range, the reverse brake B2 is actuated along with the low-coast reverse brake B1. Under these conditions the rotation of the input shaft 2 is applied to the stepless transmission mechanism 6 as reverse rotation since the ring gear 5r is fixed by the dual planetary gear unit 5. Meanwhile, since the sun gear 9s of the single planetary gear unit 9 is fixed based on operation of the low-coast reverse brake B1, the reverse rotation of the stepless transmission mechanism 6 is reduced in speed by the single planetary gear unit 9 before being extracted at the output member 10.

Figure 4:
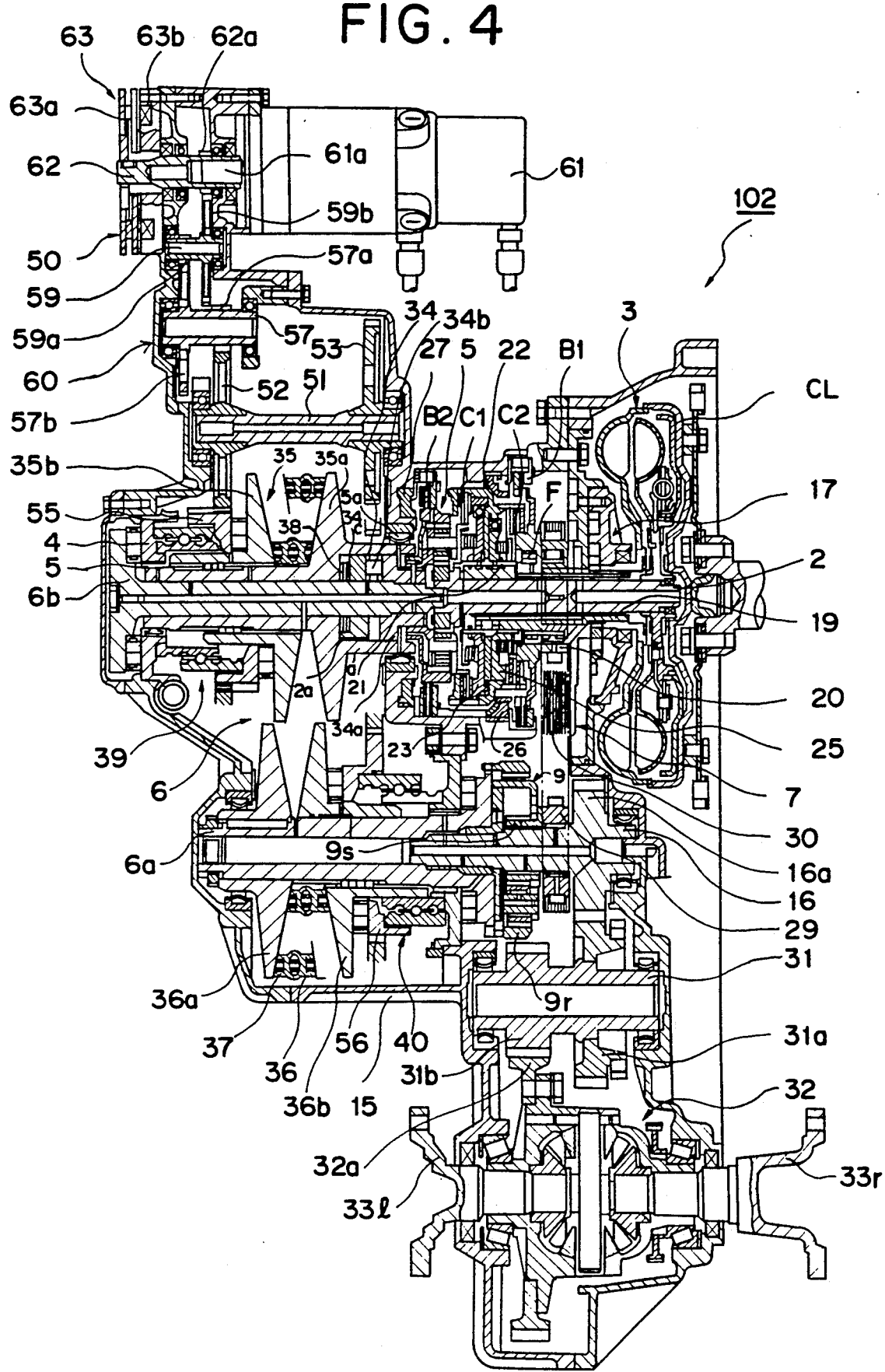
FIG. 4 is a sectional view showing the details of the stepless belt transmission.

An embodiment of the stepless belt transmission 102 will now be described with reference to FIG. 4.

The stepless belt transmission 102 has a transmission case 15 divided into three sections. The input shaft 2 and a primary shaft 6b of the stepless transmission mechanism 6, which are coaxially supported by the case 15 so as to be freely rotatable, construct a drive shaft. A secondary shaft of the stepless transmission mechanism 6 and a gear shaft 16, which are coaxially supported by the case 15 so as to be freely rotatable, construct a driven shaft. Provided on the driven shaft are the fluid coupling having the lock-up clutch CL, the forward clutch Cl, the high clutch C2, the low-coast reverse brake B1, the reverse brake B2, the one-way clutch F, the dual planetary gear unit 5 constituting a forward-/reverse rotation changeover unit, and a hydraulic pump 17. The single planetary gear unit 9 is provided on the driven shaft.

The input shaft 2 has one end with which the output member of the fluid coupling 3 is engaged, and another end with which the sun gear 5s of the dual planetary gear unit 5 is engaged. A sprocket 20 is connected via the one-way clutch F to a sleeve 19 provided on the input shaft 2 and fixed to the case 15. A sleeve shaft 21 connected to the input shaft 2 is freely rotatably supported on the sleeve 19. The one-way clutch Cl is arranged along with its hydraulic actuator 23 on one side of a flange 22 upstanding from the sleeve shaft 21, and the high clutch C2 is arranged along with its hydraulic actuator 25 on the other side of the flange 22.

The high clutch C2 has a driven side connected to a boss of the sprocket 20, and the boss is connected to the low-coast reverse brake B1 arranged in the case 15 along with its hydraulic actuator 26. The driven side of the forward clutch Cl is connected to the carrier 5c of the dual planetary gear unit 5. The ring gear 5r is engaged with the reverse brake B2 arranged in the case 15 along with a hydraulic actuator 27.

A sprocket 29 is supported so as to be freely rotatable, in unison with the sun gear 9s of the single planetary gear unit 9, on the gear shaft 16 constituting a driven shaft. The carrier 9c, which freely rotatably supports a pinion 9pl1, is splined to the gear shaft 16. A silent chain 30 is stretched between the sprockets 20, 29. These sprockets and the chain construct the transfer unit 7.

The gear shaft 16 is formed to include a gear 16a meshing with a gear 31a formed on an intermediate shaft 31. The latter is also formed to have a gear 31b meshing with a ring gear 32a fixed to a differential gear unit 32. The differential gear unit 32 is provided with left and right front axles 33l and 33r.

The stepless transmission mechanism 6 comprises a primary pulley 35, a secondary pulley 36 and a belt 37 stretched between the two pulleys. The pulleys 35, 36 comprise fixed sheaves 35a, 36a and movable sheaves 35b, 36b, respectively. The fixed sheave 35a of the primary pulley 35, which is fitted over the primary shaft 6b, is freely rotatably supported on the case 15. The movable sheave 35b of the primary pulley is freely slidably supported on the fixed sheave 35a via a ball spline and has a ball screw device 39 disposed on its outer periphery. Similarly, the fixed sheave 36a of the secondary pulley 36 is fitted over the secondary shaft 6a and is freely rotatably supported on the case 15. The movable sheave 36b is slidably supported on the fixed sheave 36a via a ball spline and has a ball spline device 40 disposed on its outer periphery.

A shift operating device 50 is arranged in order to adjust the spacing between the two sheaves of the primary pulley 35 and secondary pulley 36. The device 50 has an operating shaft 51 freely rotatably supported on the case 15. Fixed to the operating shaft 51 are a circular gear 52 and a non-circular gear 53. The circular gear 52 meshes with a circular gear 55 on the side of the primary pulley 35, and the non-circular gear 53 meshes with a non-circular gear 56 on the side of the secondary pulley 36. Further, the circular gear 52 meshes with a small-diameter gear 57a provided on an intermediate shaft 57. Secured to the intermediate shaft 57 is a large-diameter gear 57b meshing with a small-diameter gear 59a formed on a different intermediate shaft 59. These gears construct a speed reducing unit 60 having a high transfer efficiency.

An electric motor (or ultrasonic motor) 61 such as a servomotor is arranged on the case 15. The motor 61 has an output shaft 61a to which is secured a shaft 62 having a small-diameter gear 62a meshing with a largediameter gear 59b formed on the intermediate shaft 59. A brake plate 63a is fixed to the shaft 62. An electromagnetic coil member 63b is fixed to the case 15. The coil member 63b and brake plate 63a construct an electromagnetic brake 63 which holds the operating shaft 51 at rest. If the ultrasonic motor is employed, the motor will have a retaining mechanism therein so that a special retaining mechanism such as the abovementioned electromagnetic brake will be necessary.

The operation of the stepless belt transmission will now be described in detail.

In the D range and S range, the forward clutch Cl is engaged and the reverse brake B2 is released. Accordingly, the sun gear 5s and the carrier 5c of the dual planetary gear unit 5 rotate in unison. Forward rotation is transmitted from the carrier 5c to a fixed race 34a of a pressure governing cam mechanism 34 in the stepless transmission mechanism 6.

The rotation of the fixed race 34a rotates the threadedly engaged primary shaft 6b, rotates a roller 34b situated on a corrugated end face, the fixed sheave 35a of the primary pulley 35, and rotates the movable sheave 35b via the ball spline. At this time the fixed sheave 35a has both its ends supported on the case 15 via bearings 5e, 5a, and there is a clearance between the fixed race 34a and a fixed sheave hub portion a. Therefore, there is no transmission of torque from the fixed race 34a and primary shaft 6b to the fixed sheave 35a by way of friction, and the total amount of torque transmitted from the carrier (input member) 5c is transmitted to the fixed sheave 35a via the pressure governing cam mechanism 34. In the pressure governing cam mechanism 34, an axial force corresponding to the input torque that acts upon the fixed race 34a acts upon the back face of the sheave 35a via a dish spring 38. Meanwhile, the other sheave 35b is in a state in which the ball screw device 39 is fixed in the longitudinal direction thereof in accordance with a predetermined gear ratio. Accordingly, an equivalent reaction force acts upon the back face of the sheave 35b via a slide bearing. As a result, the primary pulley 35 grips the belt 37 with a gripping force corresponding to the input torque.

An axial force that acts upon the movable sheave 35b acts upon the slide bearing, the ball screw device 39, an adjusting retainer 4 and a large-diameter flange portion of the primary shaft 6b via the slide bearing. An axial force that acts upon the fixed sheave 35a acts upon the shaft 6b from the fixed race 34a via a screw i. Accordingly, the axial force is borne within this shaft as a tensile force. Rotation of the belt 37 is transmitted to the secondary pulley 36 and is also transmitted to the secondary shaft 6a via a key and ball spline.

At the time of belt drive, the motor 61 is controlled on the basis of signals from various sensors for throttle opening, vehicle speed and the like, whereby the operating shaft 51 is rotated via the speed reducing unit 60. When this takes place, the ball screw device 39 on the side of the primary pulley 35 is rotated via the circular gears 52 and 55, and the ball screw device 40 on the side of the secondary pulley 36 is rotated via the non-circular gears 53, 56. As a result, the ball screw devices 39, 40 move the movable sheaves 35b, 36b to set the primary pulley 35 and the secondary pulley 36 to predetermined effective diameters to obtain a set torque ratio. In a state where the set torque ratio has been obtained, current to the motor 61 is cut off and the electromagnetic brake 63 is actuated to hold the pulleys 35, 36 in the abovementioned torque ratio state.

Rotation of the secondary shaft 6a of the stepless transmission mechanism 6 is transmitted to the ring gear 9r of the single planetary gear unit 9 and to the gear shaft 16 via the carrier 9c.

At this time the low one-wa clutch F is in the actuated state, as shown in FIG. 3, if the low-speed side L in the D range prevails. Accordingly, when torque is transmitted from the ring gear 9r to the carrier 9c, the sun gear 9s receives a reaction force but is fixed against rotation, by virtue of the low one-way clutch F, via the transfer unit 7. Rotation of the secondary shaft 6a is subjected to a speed reduction by the single planetary gear unit 9, and to a further speed reduction by gears 16a, 31a, 31b before being outputted to the differential gear unit 32.

When the throttle opening and vehicle speed attain predetermined values, the high clutch C2 is engaged by a signal from the control unit to effect a changeover to the high-speed side H. When this is achieved, rotation of the input shaft 2 is transmitted to the stepless transmission mechanism 6, to the sprocket 20 via the high clutch C2, and to the sun gear 9s of the single planetary gear unit 9 via the chain 30 and sprocket 29. At this time the sprocket 20 on the input side of the transfer unit 7 receives a reaction force from the sun gear 9s of the single planetary gear unit 9 owing to the low one-way clutch F. This prevents shift shock due to re-engagement. In this way the torque resulting from the stepless speed change performed by the stepless transmission mechanism 6 and the torque through the transfer unit 7 are combined in the single planetary gear unit 9, and the combined torque is transmitted from the carrier 9c to the gear shaft 16.

On the low-speed side L in the S range, a negative torque due to engine braking or the like is also received. Accordingly, the low-coast reverse brake B1 is engaged to prevent forward and reverse rotation of the sprocket 20. Operation on the high-speed side H in the S range is similar to that on the high-speed side H in the D range.

In the R range, the forward clutch C1 is released and the reverse brake B2 is engaged. As a result, with stopping of the ring gear 5r, the rotation of the input shaft 2 transmitted to the sun gear 5s of the dual planetary gear unit 5 is transmitted from the carrier 5c to the primary shaft 6b of the stepless transmission mechanism 6 as reverse rotation. At this time a reaction force torque from the sun gear 9s of the single planetary gear unit 9 acts as reverse rotation upon the sprocket 20 via the transfer unit 7. As a result, the low-coast reverse brake B1 is actuated to stop the sprocket 20.

The construction and operation of the hydraulic control unit 105 shown in FIG. 1 will now be described with reference to FIGS. 5 through 10.

Figure 5:
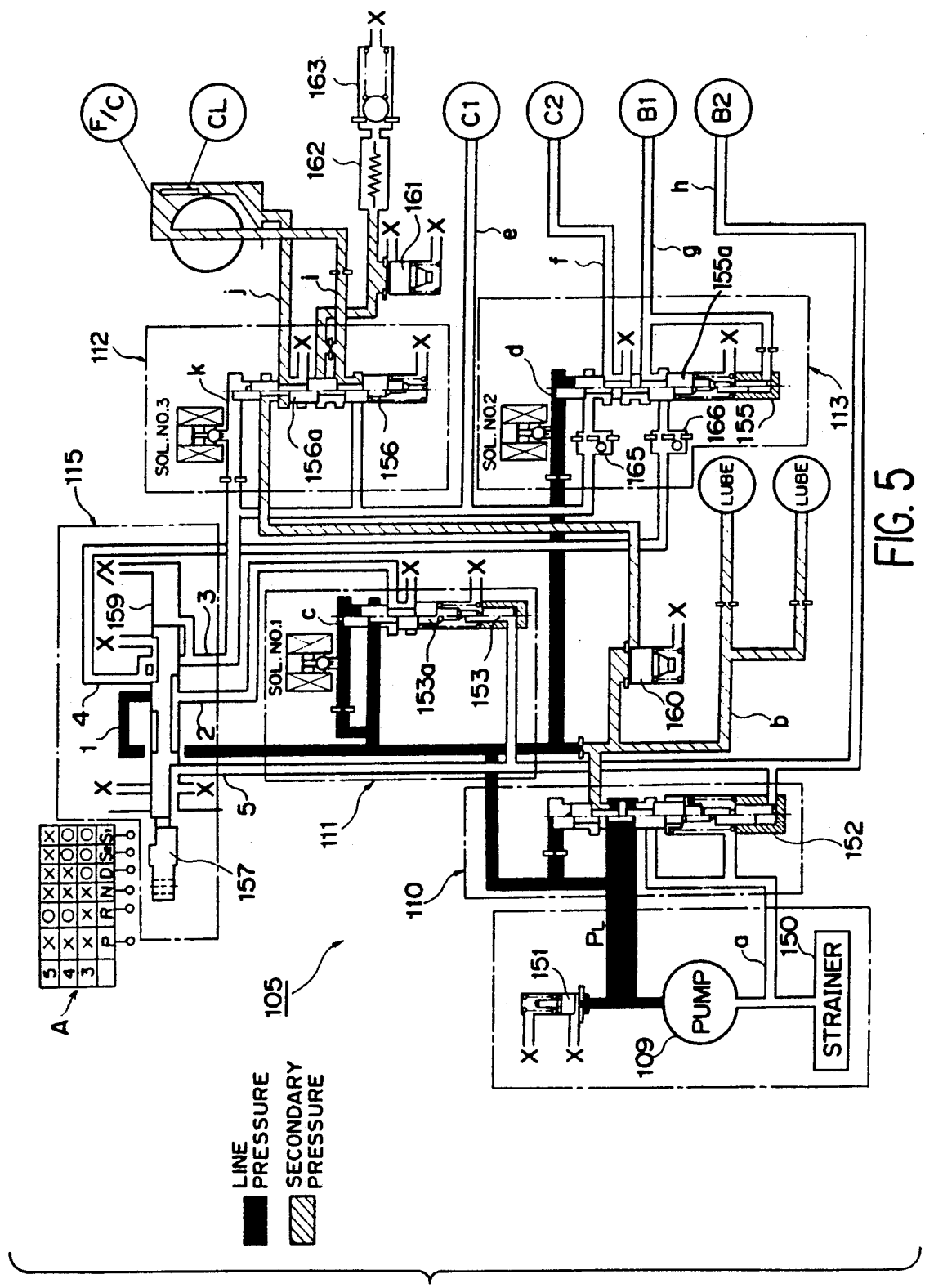

As shown in FIG. 5, the hydraulic control unit 105 comprises a hydraulic pressure generator 118, the line pressure regulator 110, the shift pressure controller 111, the start controller 112, the L-H changeover controller 113 and the speed selector 115. The lock-up clutch CL, fluid coupling FC, reverse brake B2, forward clutch C1, high clutch C2 and low-coast brake B1 are controlled in response to commands from the electronic control unit 108.

The oil pump 109 of the hydraulic pressure generator 118 draws in the working oil from an oil tank (not shown) via a strainer 150 and feeds the working oil under pressure into an oil line 1 at line pressure. A regulator valve 152 of the line pressure regulator 110 regulates the line pressure to a predetermined hydraulic pressure and exhausts extra oil into an oil line b as secondary pressure.

The shift pressure controller 111 comprises a shift pressure control valve 153 having a pressure governing function, and a solenoid NO. 1. A shift control pressure $P_2$ acting upon the oil line 2 is controlled by varying the hydraulic pressure (solenoid pressure $P_{SD1}$) in an oil chamber c, the latter being performed by controlling the duty of the solenoid NO. 1.

The L-H changeover controller 113 comprises an L-H changeover valve 155 having a pressure governing function, and a solenoid NO. 2. Hydraulic pressure $P_{C2}$ acting upon a hydraulic servo of the high clutch C2 and hydraulic pressure $P_{B1}$ acting upon a hydraulic servo of the low-coast reverse brake B1 are controlled by varying the hydraulic pressure (solenoid pressure $P_{SD2}$) in an oil chamber d, the latter being performed by controlling the duty of the solenoid NO. 2. Thus, changeover between the L mode and the H mode is carried out.

The start controller 112 comprises a lock-up control valve 156 having a pressure governing function, and a solenoid NO. 3. Lock-up OFF pressure $P_{OFF}$ acting upon an oil line j is controlled by varying the hydraulic pressure (solenoid pressure $P_{SD3}$) in an oil chamber k, the latter being performed by controlling the duty of the solenoid NO. 3. Lock-up pressure $P_{L-UP}$ acting upon the lock-up clutch CL is controlled by the difference between the lock-up OFF pressure $P_{OFF}$ and lock-up ON pressure $P_{ON}$, which acts upon an oil line i.

These solenoids are of a type in which a ball valve (not shown) opens a drain oil line at energization and closes the drain oil line at deenergization, and in which duty control is performed (i.e., in which hydraulic pressure is controlled by varying the ratio of solenoid coil energization time to deenergization time).

The speed selector 115 comprises a manual valve 159 having a spool 157 linked to the shift lever. When the spool 157 is moved to the P, R, N, D, S2 and S1 positions, the oil lines 1, 2 are selectively connected to oil lines 3, 4 and 5, as shown in table A in FIG. 5. It should be noted that S1, S2 perform the same function in terms of the hydraulic circuitry and change the method of shift control at the electronic control unit.

A pressure relief valve 151 is a safety valve which opens when line pressure $P_L$ exceeds a predetermined value, thereby draining oil. A check valve 160 prevents reverse flow of oil from the fluid coupling after the engine is stopped. A cooler bypass valve 161 is a safety valve which drains oil when hydraulic pressure acting upon a cooler 162 exceeds a predetermined value. A check ball valve 163 prevents draining of oil from the fluid coupling after the engine is stopped.

The operation of the hydraulic pressure control unit 105 constructed as set forth above will now be described.

FIG. 5 is a view showing operation in the N or P range. As shown in table A, in the N or P range the oil lines 1, 2 are cut off from the oil lines 3, 4 and 5 by a manual valve 159. Hydraulic pressure does not act upon each of the friction elements, and only secondary pressure acts upon the fluid coupling and lubrication system through the oil line b.

Figure 6:
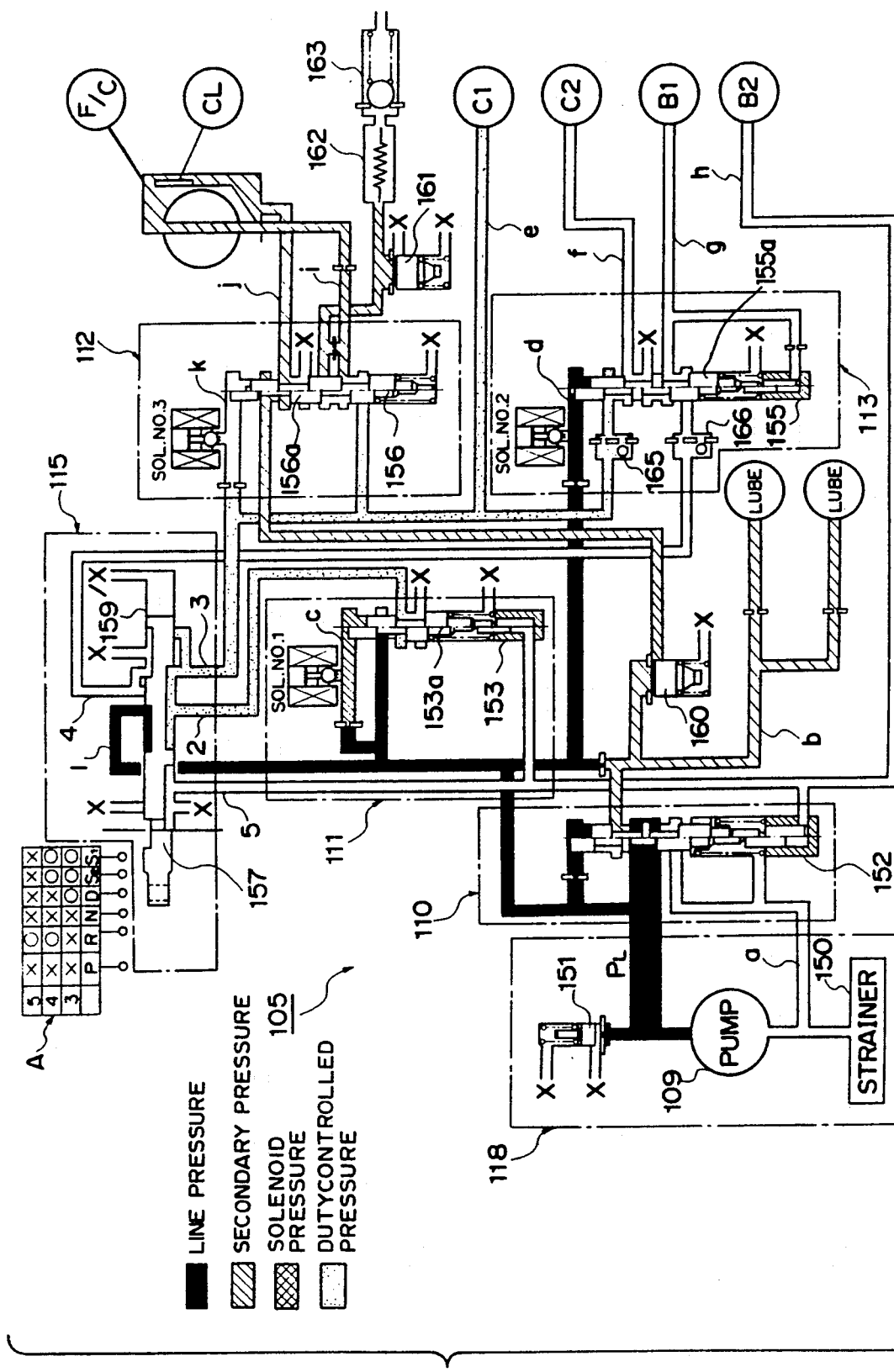

FIG. 6 is a view showing operation in a case where a shift is made from the N range to the D range. In the D range, a shown in the table A, the oil line 3 is connected to the oil line 2 by the manual valve 159, so that shift control pressure $P_2$ acts upon the oil line 3 and the hydraulic servo of the forward clutch C1. At this time the solenoid NO. 1 has its duty controlled in such a manner that its energization time is reduced, thereby engaging the forward clutch C1 without shock.

More specifically, the relationship between solenoid pressure $P_{SD1}$ acting upon the oil chamber c of the shift pressure control valve 153 and the shift control pressure $P_2$ (in the D range, hydraulic pressure $P_{C1}$ which acts upon the hydraulic servo of the forward clutch C1) is as shown by the line A in FIF. 11(a). Therefore, by controlling the duty of solenoid NO. 1 to vary $P_{SD1}$, first the hydraulic pressure $P_{C1}$ acting upon the hydraulic servo of the forward clutch C1 is raised to a hydraulic pressure that causes the forward clutch C1 to start engaging, and thereafter is raised in gradual fashion to a hydraulic pressure that completes engagement, thereby engaging the forward clutch C1 without shock. After this clutch is engaged, current to the solenoid NO. 1 is completely cut off so that line pressure acts upon the hydraulic servo of the forward clutch C1 and the oil line 3. At this time, as shown in FIG. 3, the solenoid NO. 2 is already energized in the N range, and line pressure acts upon the oil chamber d of the L-H changeover control valve 155. As a result, the oil line 3 and the oil line f are cut off by the valve 155, and hydraulic pressure does not act upon the hydraulic servo of the high clutch C2.

Figure 7:
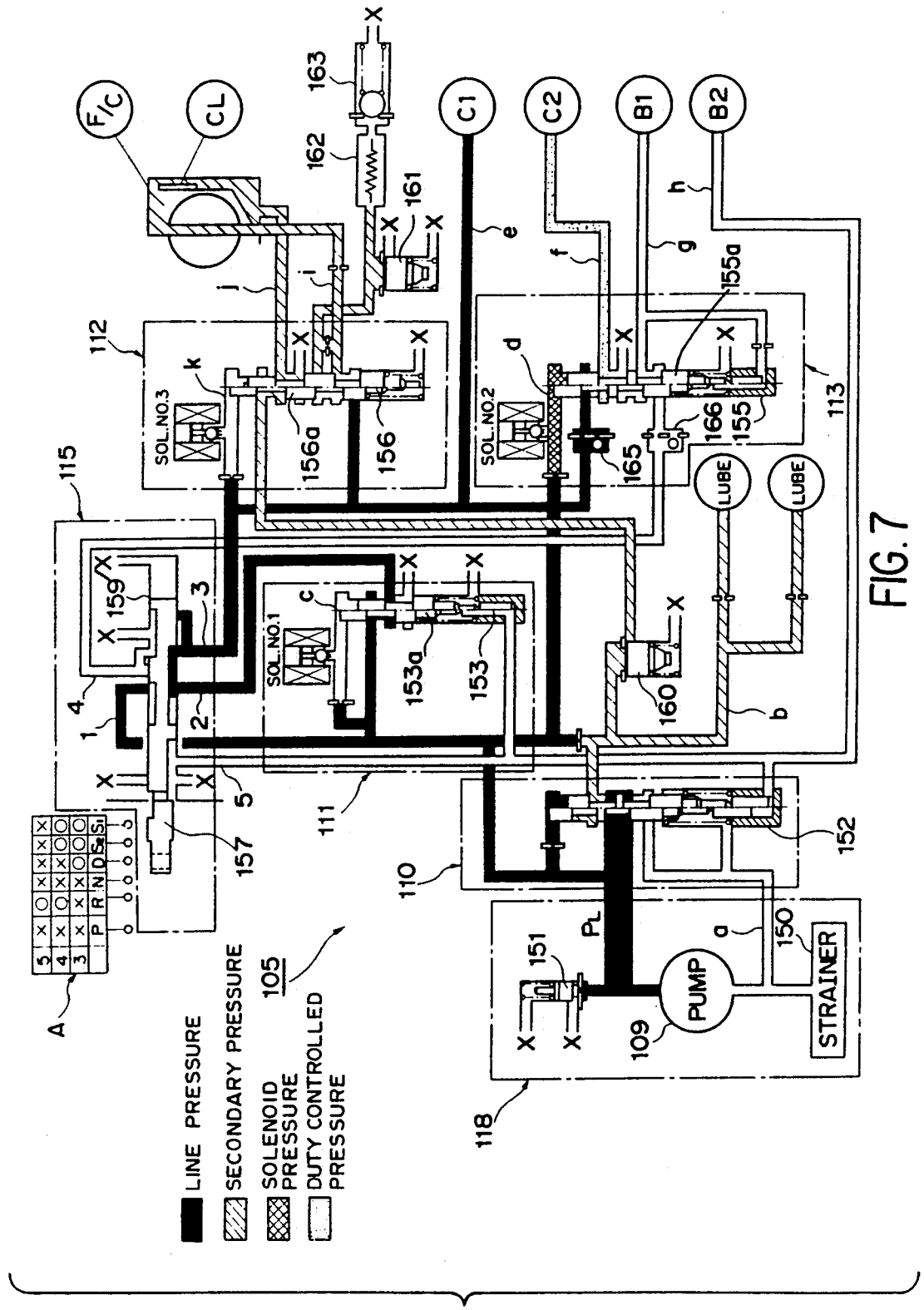
Figure 11A:
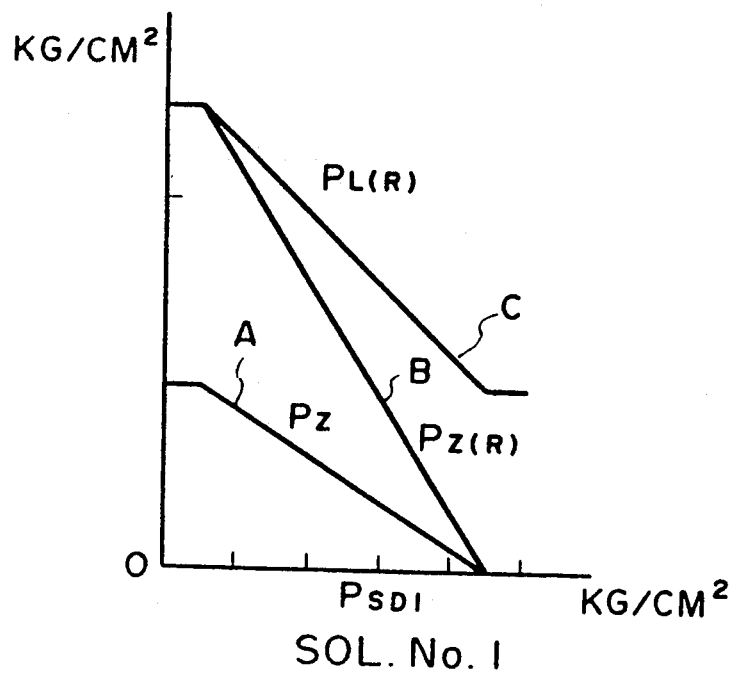
FIG. 11 is a view showing the relationship between solenoid pressure for each solenoid and hydraulic pressure acting upon each friction element.
Figure 11B:
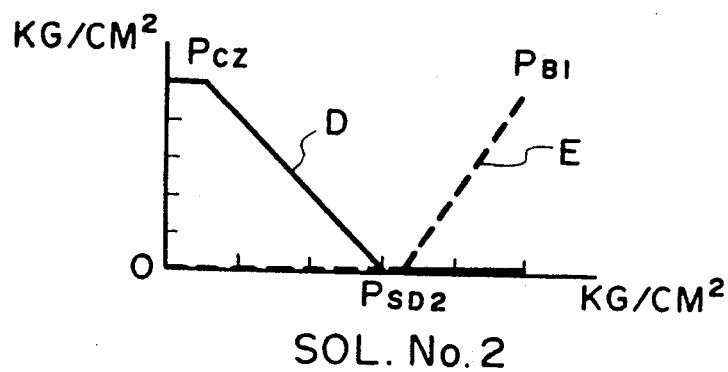

FIG. 7 is a view showing operation in a case where a shift is made from the L mode to the H mode in the D range At this time the solenoid NO. 2 has its duty controlled in such a manner that its energization time is reduced, thereby engaging the high clutch C2 without shock. More specifically, the relationship between solenoid pressure $P_{SD2}$ acting upon the oil chamber d of the L-H changeover control valve 155 and the hydraulic pressure $P_{C2}$ which acts upon the hydraulic servo of the high clutch C2 is as shown by the line D in FIG. 11(b). Therefore, by controlling the duty of solenoid NO. 1 to vary $P_{SD2}$, first the hydraulic pressure $P_{C2}$ acting upon the hydraulic servo of the high clutch C2 is raised to a hydraulic pressure that causes the high clutch C2 to start engaging, and thereafter is raised in gradual fashion to a hydraulic pressure that completes engagement, thereby engaging the high clutch C2 without shock. After this clutch is engaged, energization of solenoid NO. 2 is made 100% so that line pressure acts upon the hydraulic servo of the high clutch C2. It should be noted that a shift from the H mode to the L mode is performed in a reverse manner, i.e., by controlling the duty of solenoid NO. 2 so as to lengthen its energized time, gradually reducing the hydraulic pressure $P_{C2}$ acting upon the hydraulic servo of the high clutch C2 and releasing the high clutch C2.

Figure 8:
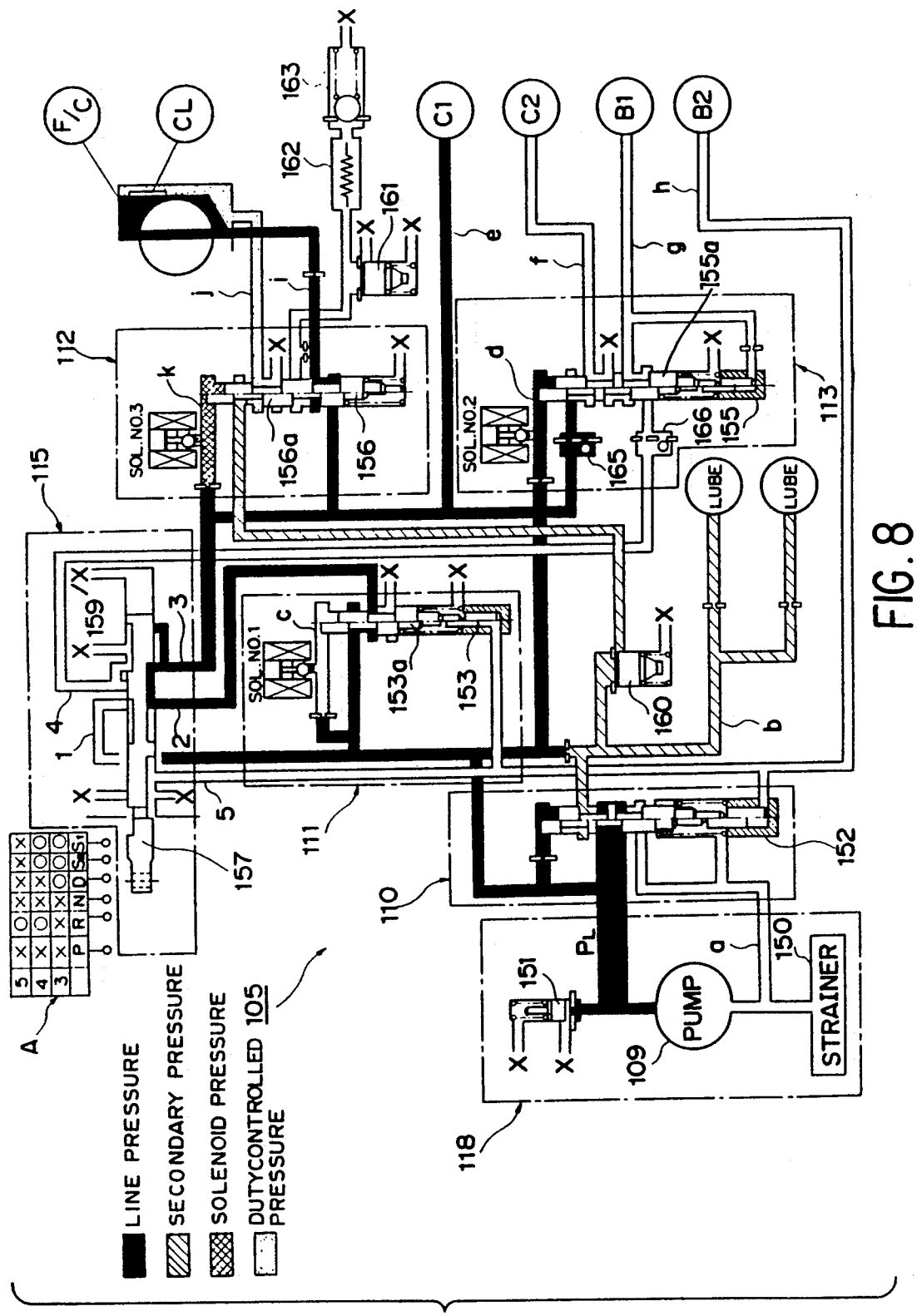
Figure 11C:
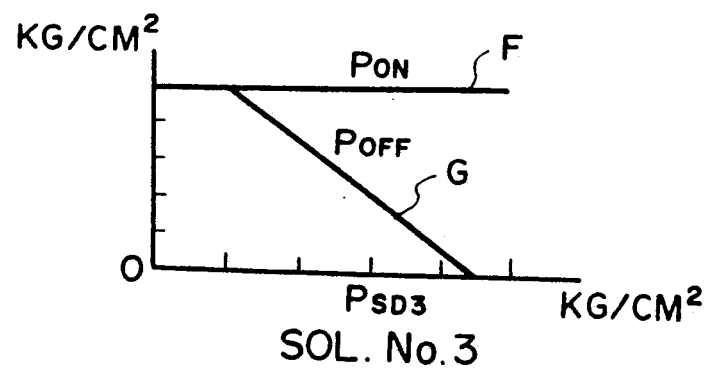

FIG. 8 is a view showing operation in case of lock-up in the L mode of the D range. When lock-up takes place in the D range or S range, the duty of solenoid NO. 3 is controlled so as to lengthen its energized time and the solenoid pressure $P_{SD3}$ that acts upon the oil chamber k of the lock-up control valve 156 is gradually raised. When this is done, first the line pressure acting upon the oil line 3 in the D range and S range acts upon the chamber shown to be on the left side of the fluid coupling FC in FIG. 7 via the lock-up control valve 156 and oil line i (this is lock-up ON pressure $P_{ON}$), and lock-up OFF pressure $P_{OFF}$ shown to be on the right side of the fluid coupling FC gradually decreases so that the lock-up clutch CL is urged in a gradual manner until it is fully engaged. After the clutch CL is engaged, energization of solenoid NO. 3 is made 100%. This state is illustrated by lines F and G in FIG. 11(c), in which it is shown that as solenoid pressure $P_{SD3}$ (the pressure in chamber k) rises, line pressure acts upon the oil line i while the pressure in line j gradually declines.

Figure 9:
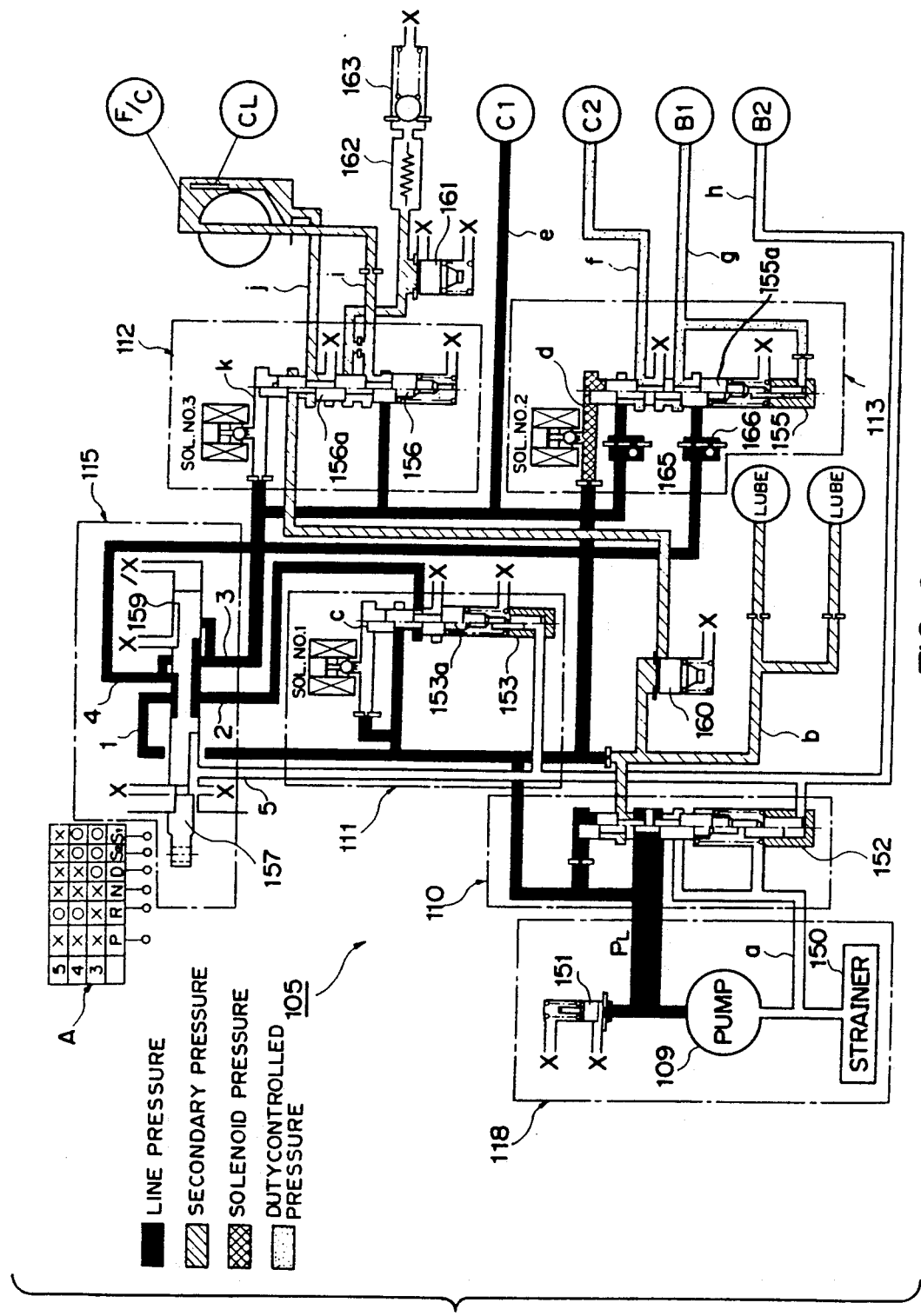

FIG. 9 is a view showing operation in a case where the L mode and H mode are shifted between alternatingly in the S1 and S2 ranges (hereinafter referred to collectively as the "S" range). In the S range, the oil lines 3, 4 are connected respectively to the oil lines 1, 2, shift control pressure acts upon the oil line 3, and line pressure acts upon the oil line 4. When a changeover is made from the N range to the S range by skipping over the D range, the clutch C1 is engaged just as in the D range. At the same time the changeover is made to the S range, line pressure acting upon the oil line 4 is applied to the hydraulic servo of brake B1 through an orifice 166 equipped with a check valve, the L-H changeover control valve 155, and the oil line g.

When a shift is made from the L mode to the H mode in the S range, the high clutch C2 is engaged just as in the case of the D range. At this time, however, hydraulic pressure $P_{B1}$ that acts upon the hydraulic servo of the low-coast reverse brake B1 is drained at a stroke. When a shift is made from the H mode to the L mode in the S range, the solenoid NO. 2 has its duty controlled. As a result, hydraulic pressure $P_{C2}$ acting upon the hydraulic servo of the high clutch C2 is drained at a stroke, and hydraulic pressure $P_{B1}$ acting upon the hydraulic servo of the low-coast reverse brake B1 is gradually raised from a hydraulic pressure which causes the low-coast reverse brake B1 to start engaging to a hydraulic pressure which causes engagement to be completed, thereby causing the low-coast reverse brake to engage without shock. After engagement is achieved, the energization of the solenoid NO. 2 is made 100% so that line pressure is made to act upon the hydraulic servo of the low-coast reverse brake B1. The relationships between solenoid pressure $P_{SD3}$ acting upon the oil chamber d of the L-H changeover control valve 155 and the hydraulic pressures PC2, $P_{B1}$ which act upon the hydraulic servos of the high clutch C2 and low-coast reverse brake B1 are as shown by the lines D, E in FIG. 11(b). As will be understood from the figure, hydraulic pressures do not act upon the hydraulic servos of the high clutch C2 and low-coast reverse brake B1 simultaneously; hence, the high clutch C2 and the low-coast reverse brake B1 will not engage simultaneously.

Figure 10:
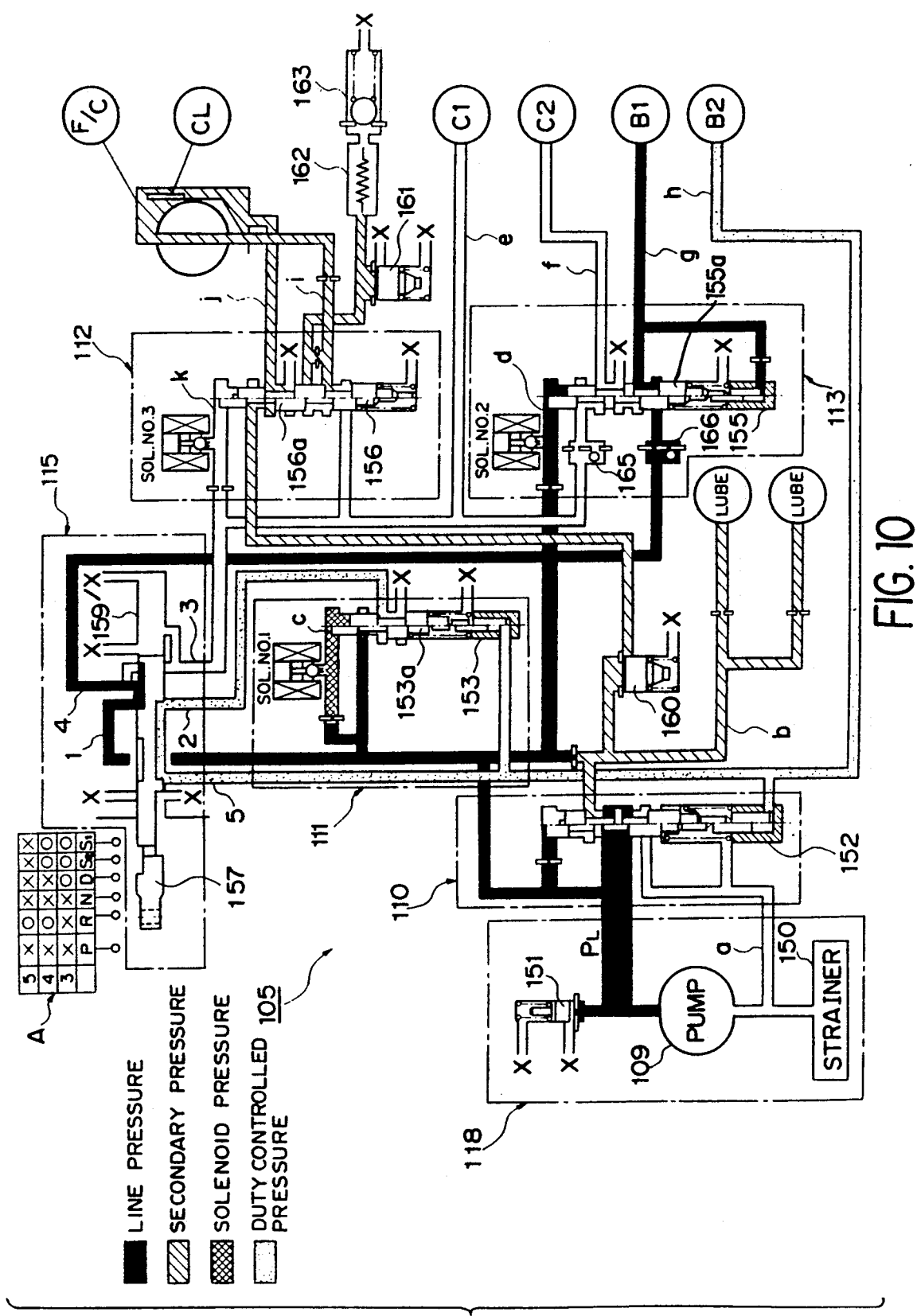

FIG. 10 is a view showing operation in a case where a shift is made from the N range to the R range. In the R range, as shown by table A, oil line 4 is connected to oil line 1 and oil line 5 is connected to oil line 2 by the manual valve 159 so that line pressure acts $P_L$ upon oil line 4 and shift control pressure $P_2$ upon oil line 5. Since the solenoid NO. 2 is energized, as shown in FIG. 3, line pressure acts upon the oil chamber d of the L-H changeover control valve 155. Consequently, oil line 4 and oil line g are connected by the L-H changeover control valve 155 and line pressure $P_L$ acts upon the hydraulic servo of the low-coast reverse brake B1. Though the shift control pressure $P_2$ acts upon the hydraulic servo of the reverse brake B2, the solenoid NO. 1 is already energized in the P range or N range, as shown in FIG. 3, when a shift change is made from the P range or N range to the R range. Therefore, the oil line 2 is completely cut off from the oil line 1 by the shift pressure control valve 153, so that the shift control pressure $P_2$ is zero.

Thereafter, the duty of the solenoid NO. 1 is controlled so as to reduce its energized time, thereby engaging the reverse brake B2 without shock. More specifically, the relationship between solenoid pressure $P_{SD1}$ acting upon the oil chamber c of the shift pressure control valve 153 and the shift control pressure $P_2$ (in the R range, a hydraulic pressure $P_{B2}$ which acts upon the hydraulic servo of the reverse brake B2) is as shown by the line B in FIG. 11(a). Therefore, by controlling the duty of solenoid NO. 1 to vary $P_{SD1}$, the hydraulic pressure $P_{B2}$ is raised to a hydraulic pressure that causes the reverse brake B2 to start engaging, and thereafter is raised in gradual fashion to a hydraulic pressure that completes engagement, thereby engaging the reverse brake B2 without shock. After this brake is engaged, the solenoid NO. 1 is deenergized so that line pressure acts upon the reverse brake B2 and oil line 5. Since the pressure in oil line 5 works to raise the line pressure and shift control pressure, line pressure rises with a rise in shift control pressure in the R range. This state is illustrated by lines B and C in FIG. 11(a), in which it is shown that as solenoid pressure $P_{SD1}$ (the pressure in chamber c) varies, shift control pressure $P_2$ acting upon the hydraulic servo of the reverse brake B2 varies as shown by line B and line pressure $P_L$ varies as shown by line C.

FIG. 12 illustrates the hydraulic pressures acting upon the hydraulic servos of the friction elements that have there duties controlled in each shift range.

The control system for the stepless belt transmission set forth above will now be described.

Figure 13:
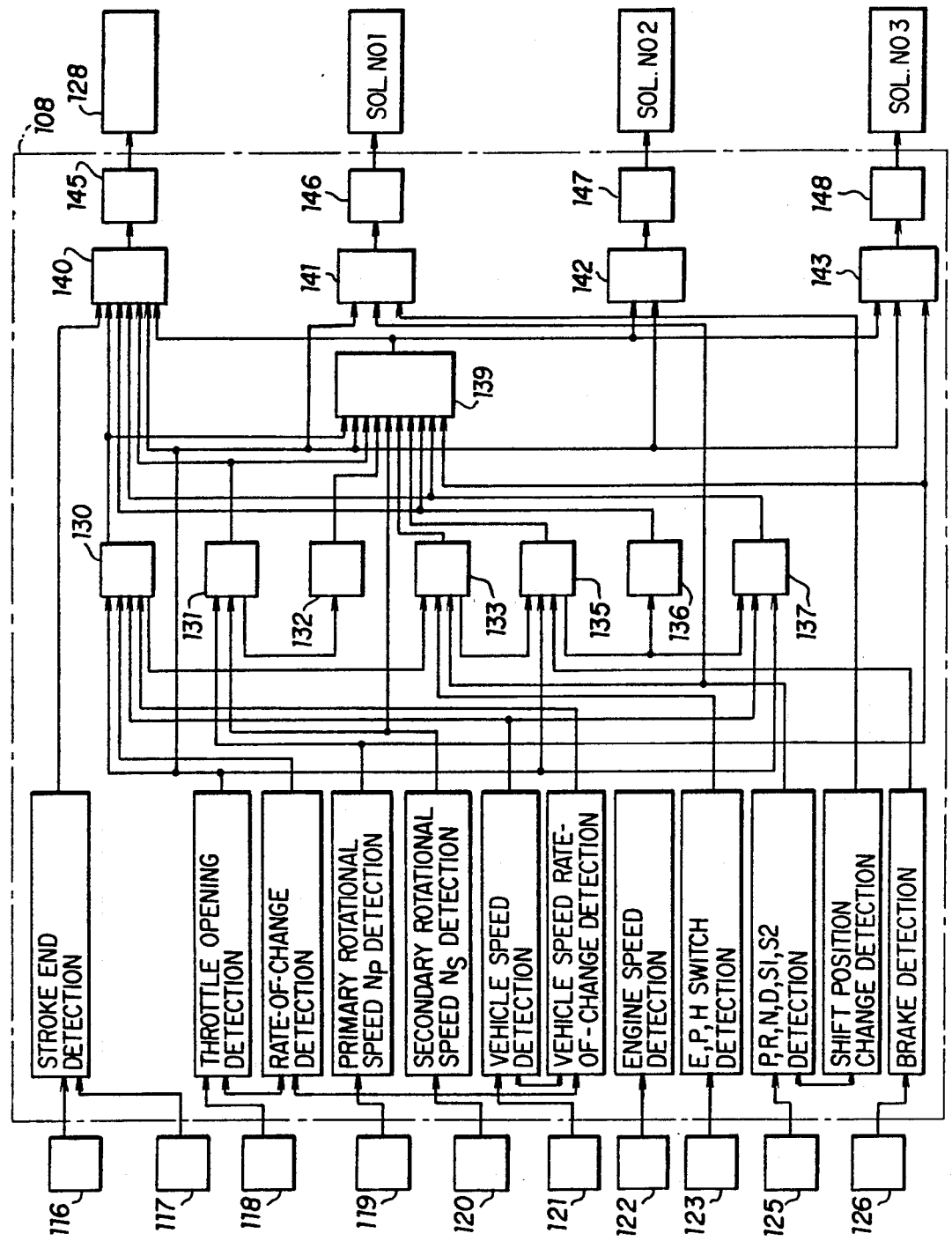
FIG. 13 is a block diagram showing the construction of an electronic control unit.

FIG. 13 shows the construction of the electronic control unit 108 depicted in FIG. 1.

As already set forth above with reference to FIG. 1, inputs signals to the electronic control unit 108 include a servomotor rotation signal 116, an alarm signal 117 from a motor driver 128, a throttle opening signal 118, a primary sheave rotational speed signal 119, a secondary sheave rotational speed signal 120, a vehicle speed signal 121, an engine speed signal 122, a pattern selection signal 123, a shift position signal 125 and a brake signal 126. On the basis of these signals, processing is executed in accordance with various programs and data stored in the electronic control unit 108 and signals are outputted to the motor driver 108 and solenoids NO. 1, NO. 2 and NO. 3.

An acceleration request decision unit 130 determines, based on throttle opening, rate of change in throttle opening, vehicle speed and rate of change in vehicle speed, whether acceleration should be performed. A present torque ratio computing unit 131 computes a present torque ratio $T_P$ from primary sheave speed and secondary sheave speed. A present system ratio computing unit 132 computes a present system ratio $a_P$ (the gear ratio of the overall system). A decision unit 133 determines, based on an output signal from the acceleration request decision unit 130, the rate of change in vehicle speed and the shift position, whether the vehicle is to be operated for optimum fuel consumption or maximum power A computing unit 135 computes a target system ratio $a^*$ from the output signal of the decision unit 133, the throttle opening and the brake detection signal. A computing unit 136 computes a target torque ratio $T_L^*$ in case of the L mode and a torque torque ratio $T_H^*$ in case of the H mode from the output signal of the decision unit 133, the throttle opening and the brake detection signal. A computing unit 137 computes a target system ratio hysteresis $a^* f$ from the target system ratio $a^*$, vehicle speed and throttle opening.

On the basis of output signals from the decision units 130, 133 and computing units 131, 132, 135, 136 and 137, an H-L selection decision unit 139 determines whether the vehicle is to operate in the H (high) mode or L (low) mode and a CVT shift decision unit 140 executes CVT shift decision processing. A decision unit 141 decides a shift from the N range to the D range and from the N range to the R range, a decision unit 142 determines changeover control between the H (high) mode and L (low) mode, and a decision unit 143 determines on/off control of the lock-up clutch. A controller 145 controls the rotational speed of the motor and performs brake control based on the results of the decision made by the decision unit 140. Controllers 146, 147, 148 control the duties of the soleniods NO. 1, NO. 2, NO. 3, respectively.

Figure 14:
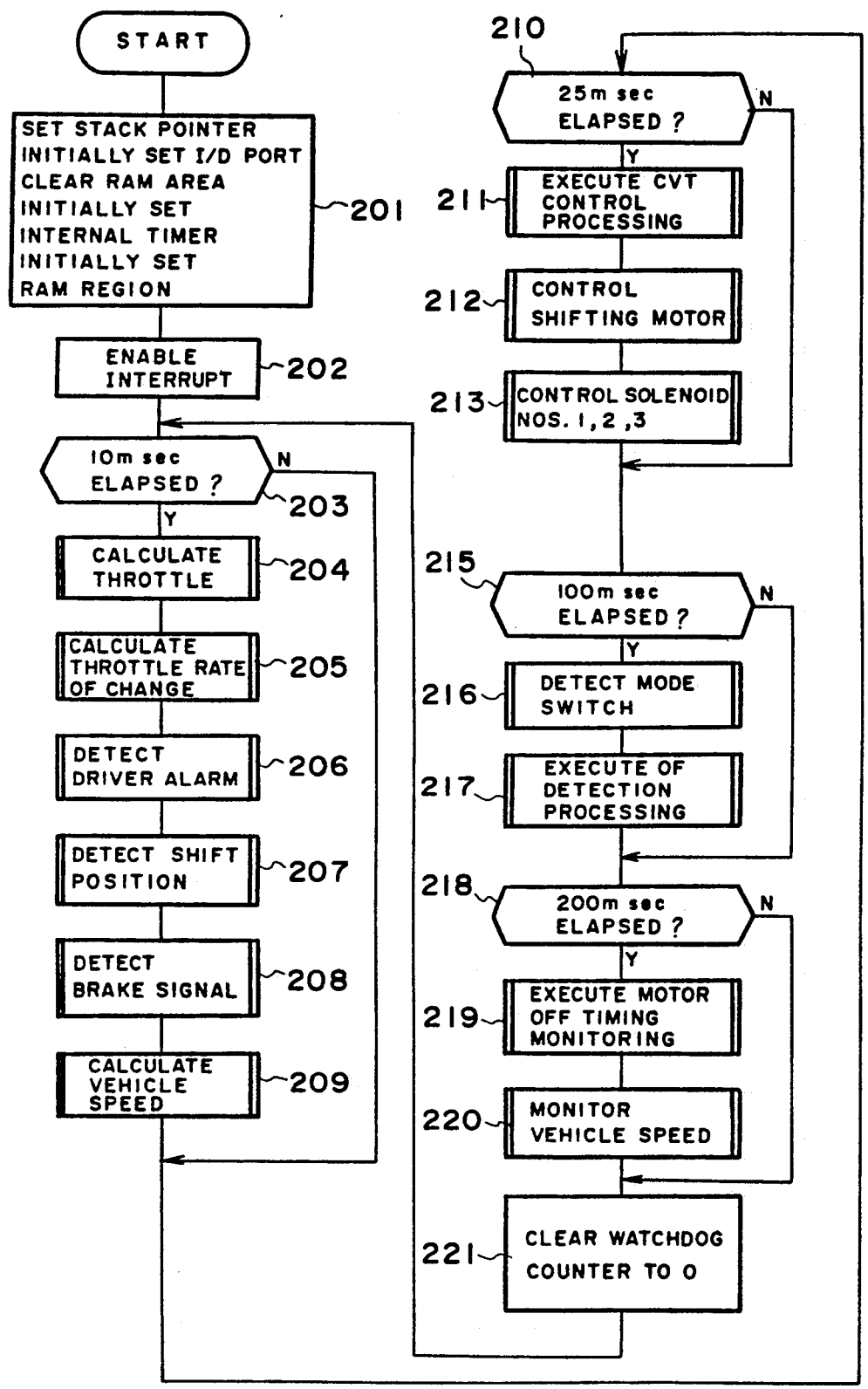
FIG. 14 is a flowchart showing the main flow of processing performed by the electronic control unit.

FIG. 14 illustrates the main routine of processing executed by the electronic control unit 108. The first step 201 of the flowchart calls for the setting of a stack pointer, the initial setting of an I/O port, the clearing of a RAM area, the initial setting of an internal timer and the initial setting of a RAM area. When an interrupt is enabled at a step 203, processing for computing throttle opening, computing the rate of change of throttle opening, detecting driver alarm, detection a shift position signal, detecting a brake signal and computing vehicle speed is executed every 10 msec (steps 204-209). Specifically, step 206 calls for processing to detect an alarm signal from the motor driver, step 207 for processing to detect in what range the shift position is located and to remove shift position chattering which occurs at range changeover, and step 208 processing to remove chattering, which occurs when the brake is turned on and off, and to input the state of the brake.

Next, step 210 calls for CVT control processing, shifting motor control processing and processing for control of solenoids NOS. 1-3 to be performed every 25 msec (steps 211-213). Mode switch signal detection and overtravel detection processing (steps 216, 217), the latter of which is for detecting whether shift control is possible, are performed every 100 msec at step 215. Processing for monitoring motor OFF timing and for monitoring vehicle speed (steps 219, 220) is executed every 200 msec at step 218. A watchdog counter is cleared to zero at step 221, after which the program returns to step 203.

Figure 15:
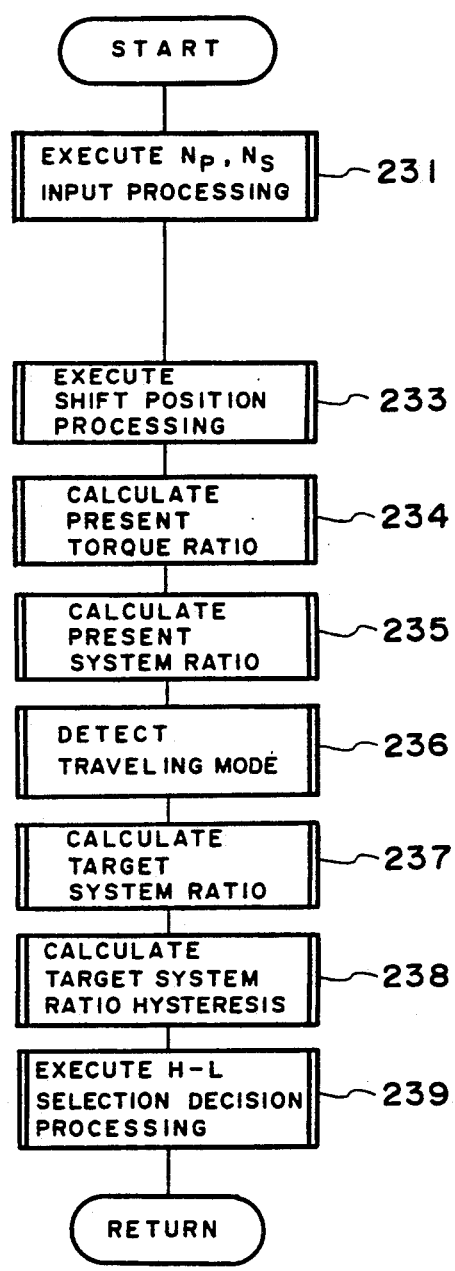
FIG. 15 is a flowchart of CVT control processing.

FIG. 15 is a flowchart illustrating the CVT control processing of step 211. Input of primary sheave speed $N_P$ and secondary sheave speed $N_S$, shift position processing and computation of present torque ratio are performed at steps 231-234, present system ratio is computed at step 235, the economy mode or power mode is detected at step 236, and target system ratio computation, target system hysteresis computation and H-L selection decision processing are executed at steps 237, 238, 239, respectively.

Figure 16:
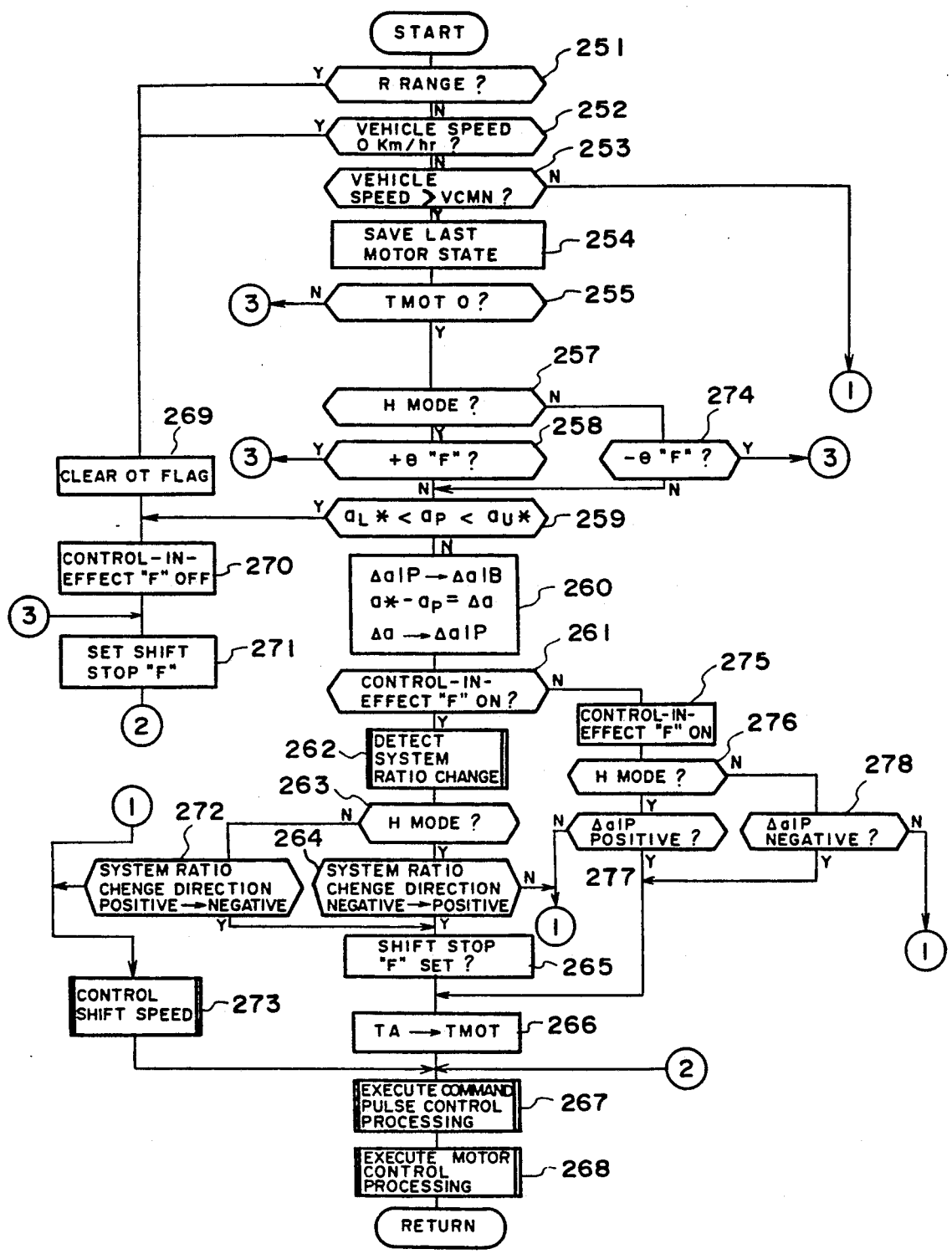
FIG. 16 is a flowchart of processing for controlling a shifting motor.

FIG. 16 is a flowchart illustrating shifting motor control of step 212 in FIG. 14.

Steps 251, 252 call for decisions as to whether the R range is in effect and as to whether the vehicle speed is zero. If the answer is NO in both steps, it is determined at a step 253 whether the vehicle speed lies in a region VCMN in which CVT shift control is possible. If the answer is YES in step 253, data indicative of the last motor state is saved at step 254. Next, it is determined at step 255 whether the time in a timer TMOT is zero. The timer TMOT is for timing the high clutch and motor when a low-high shift is made. Also when it is desired to halt motor control temporarily, the appropriate time is set in the timer TMOT; when this time expires (i.e., becomes zero), motor control becomes possible.

Figure 17:
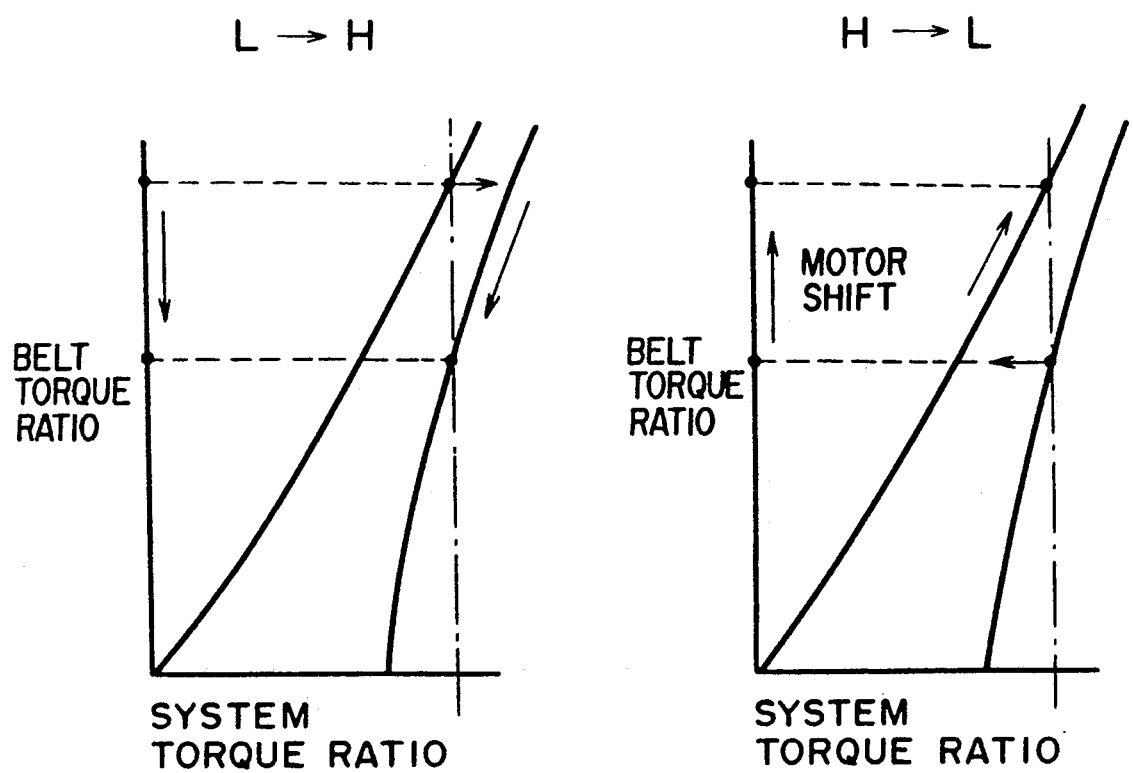
FIG. 17 is a view for describing operation when changing over between low and high.

The processing associated with step 255 will now be described in detail with reference to FIG. 17. A mode changeover L→H (a shift from low to high) or a mode changeover H→L (a shift from high to low) is performed. When a B1→C2 engagement is effected in case of L→H and a C2→B1 engagement is effected in case of H→L, the motor of the shifting section is shifted at the same time as the changeover of the clutch section in such a manner that the system torque ratio (the gear ratio of the overall system) will have the same value even after the L→H or H→L changeover is made. The timer TMOT is for timing friction element re-engagement B1→C2 or C2→B1 and the start of motor shifting. When the L→H or H→L determination is such that mode changeover is decided to take place, the timer TMOT is set. The timer TMOT is decremented by timer processing and the motor remains at rest until the time is decremented to zero.

Step 257 in FIG. 16 is for determining whether the H mode is in effect. If the H mode is in effect, it is determined at step 258 whether a flag, which is set if the throttle has been suddenly depressed, has been set. If the L mode is in effect, it is determined at step 274 whether a flag, which is set if the throttle has been suddenly released, has been set. If either of these flags has been set, then the program proceeds to point ③ so that a shift stop flag is set at step 271. If neither of these flags has been set, then it is determined at step 259 whether the present system ratio (the gear ratio of the overall system) $a_P$ lies between upper and lower limit values of the target system ratio. If the answer at step 259 is YES, a flag indicating that control is being performed is turned off at step 270 and the shift stop flag is set at step 271.

If it is found at step 259 that the system ratio (the gear ratio of the overall system) $a_P$ does not lie between the upper and lower limit values of the target system ratio, the program proceeds to step 260. Here an increment $\Delta a1P$ of the present system ratio is substituted for an increment $\Delta a1B$ of the last system ratio and the difference (shift direction) $\Delta a$ between the target system ratio $a*$ and the present system ratio $a$ is made the increment $\Delta a1P$ of the present system ratio. Next, it is determined at step 261 whether the flag indicating that control is in effect is ON. If the answer is YES, then the change from the last system ratio to the present system ratio is detected at step 262, after which it is determined at step 263 whether the H mode is in effect.

When the direction of the change from the last system ratio to the present system ratio in the H mode is from negative to positive (YES at step 264) or when the direction of the change from the last system ratio to the present system ratio in the L mode is from positive to negative (YES at step 272), the shift stop flag is set at step 265. This is followed by step 266, at which shift stop time TA is set in a timer. If a NO answer is received at step 264 or 272, the program proceeds to point "", so that shift speed control processing is executed at step 273. Here motor control direction and speed are decided. The program proceeds from step 273 to step 267, at which processing for effecting a conversion into frequency is executed in order to provide the motor driver with an output of speed data in ten stages of from 0 to 9. Motor control processing ie executed at step 268.

If the flag indicating that control is in effect is not found to be ON at the step 261, then this flag is turned ON at step 275. From this step the program proceeds to step 276, at which it is determined whether the H mode is in effect. If it is determined at steps 277, 278 that the direction of the change in system ratio is positive in the H mode or negative in the L mode, the program proceeds to step 266; otherwise the program proceeds to step 273.

Figure 18:
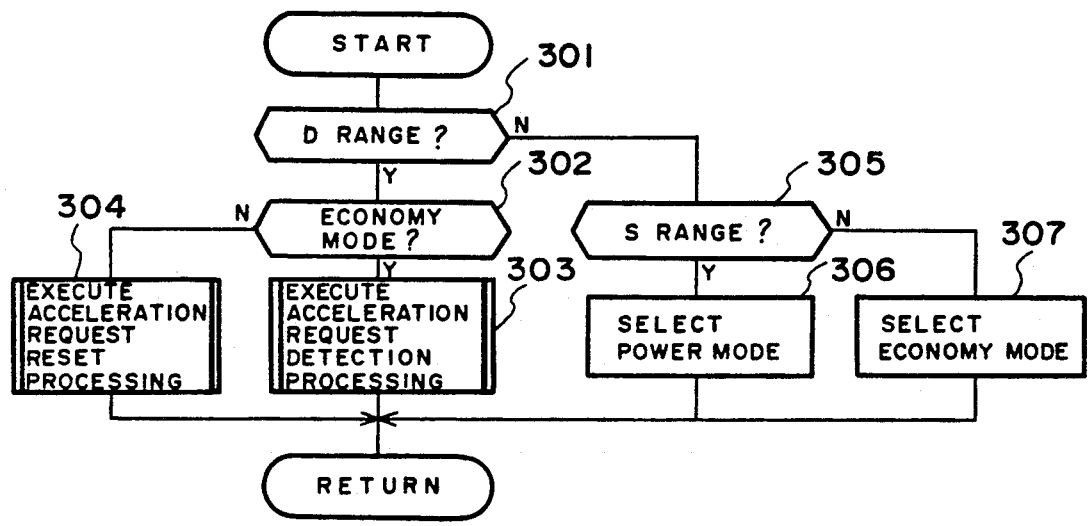
FIG. 18 is a flowchart of traveling mode detection processing.

FIG. 18 is a flowchart illustrating the traveling mode detection processing, which is a characterizing feature of the invention, of step 236 of the flowchart in FIG. 15.

First, it is determined at a step 301 whether the D range is in effect. If the answer is NO, it is determined at a step 305 whether the S range is in effect. If the range is the S range, the power mode (maximum power traveling mode) is selected at step 306; if it is not the S range, the economy mode (optimum fuel traveling mode) is selected at step 307. If it is determined at the step 301 that the D range is in effect, it is determined at step 302 whether the mode is the economy mode. Acceleration request detection processing is executed at step 303 if the economy mode is in effect and acceleration request reset processing is executed at step 304 if the economy mode is not in effect.

Figure 19:
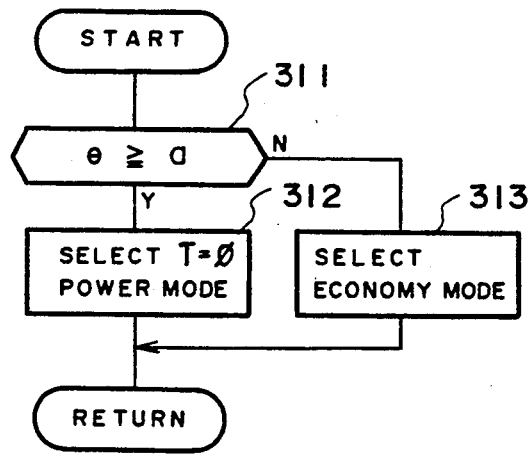
FIGS. 19 through 21 are flowcharts of acceleration request detection processing.
Figure 20:
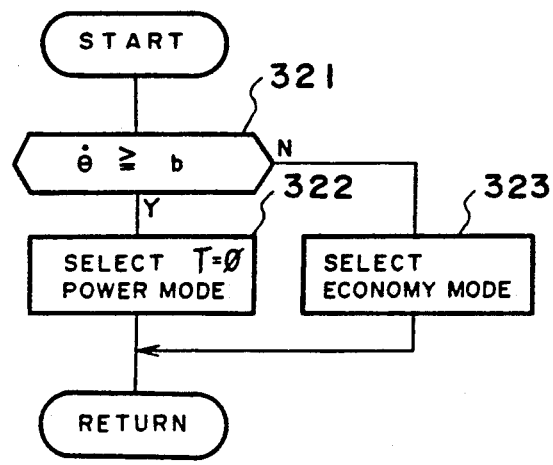
Figure 21:
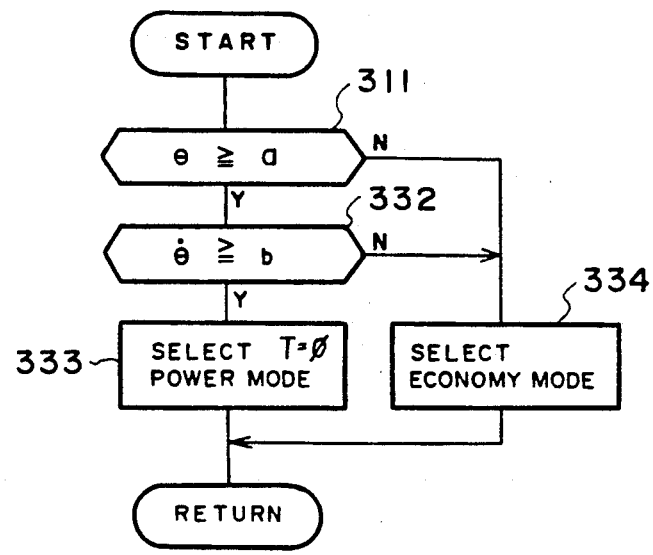

FIGS. 19 through 21 illustrate the flow of acceleration request detection processing of step 303.

It is determined at step 311 in FIG. 19 whether the throttle opening $\theta$ is equal to or greater than a predetermined opening a. If the throttle opening is large, the power mode is selected and the timer T is set to zero at step 312. If the throttle opening is less than the predetermined opening a, then the economy mode is selected at step 313.

It is determined at a step 321 in FIG. 20 whether a rate of change $\dot{\theta}$ in throttle opening is equal to or greater than a predetermined rate of change b in throttle opening. If the rate of change in throttle opening is equal to or greater than b, namely if the throttle is suddenly depressed, the power mode is selected and the timer T is set to zero at step 322; otherwise the economy mode is selected at step 323.

As shown in FIG. 21, the power mode is selected at step 333 if it is determined at steps 331, 332 that the throttle opening $\theta$ is equal to or greater than the predetermined opening a and, moreover, that the rate of change $\dot{\theta}$ in throttle opening is equal to or greater than the predetermined rate of change b; otherwise the economy mode is selected at step 334.

FIGS. 22 through 24 are flowcharts illustrating the acceleration request reset processing of step 304 in FIG. 18.

It is determined at step 351 of FIG. 22 whether the timer T has recorded a elapse of time equal to or greater than a set value c, and it is determined at a step 352 whether the throttle opening $\theta$ is equal to or less than a predetermined opening e. If the predetermined time c has elapsed and the throttle opening $\theta$ is equal to or less than the predetermined opening e, the economy mode is selected at step 353; otherwise the power mode is selected at step 354. The program returns after step 353 or 354.

In FIG. 23 the step 352 is replaced by a step 362, at which it is determined whether acceleration $\dot{v}$ is equal to or less than a predetermined value d.

As shown in FIG. 24, processing differs from that of FIG. 22 or FIG. 23 in that the economy mode is selected when it is determined at steps 371, 372, 373 that the predetermined time has elapsed, the throttle opening is equal to or less than the predetermined throttle opening and the acceleration is equal to or less than the predetermined acceleration.

Accordingly, traveling mode is selected automatically by a single working of the accelerator pedal even if the economy and power traveling modes are not selected. This makes it possible to enjoy optimum travel while improving acceleration performance.

Figure 25:
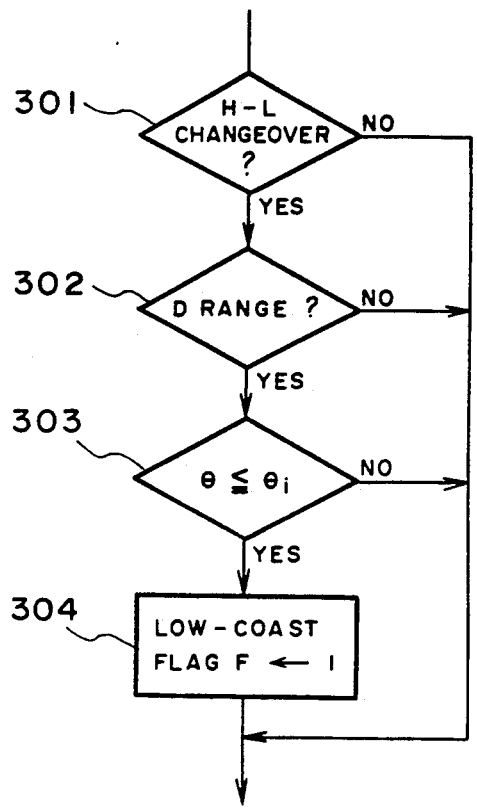
FIGS. 25 through 27 are flowcharts of motor control at the time of coasting.

FIG. 25 illustrates the flow of processing executed following the H-L selection decision processing of step 239 in FIG. 15, which processing is a characterizing feature of the invention.

It is determined at a step 301 whether a decision has been made to change over from the H mode to the L mode. If it is determined through steps 302, 303 that the accelerator opening $\theta$ is equal to or less than a coasting decision throttle opening $\theta i$ (zero or a value near zero) in the D range, a low-coast flag F is set to 1 at step 304. If the range is not the D range or if the accelerator opening $\theta$ is greater than $\theta i$, the program proceeds to other processing.

Figure 26:
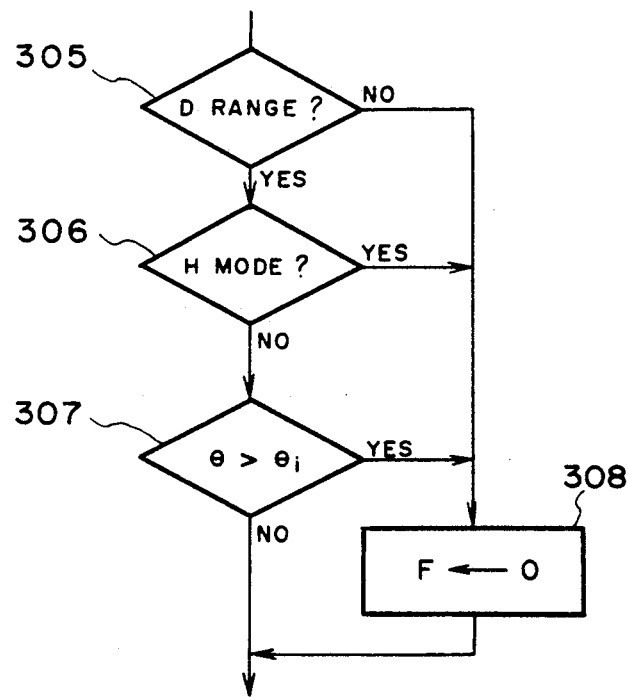

FIG. 26 illustrates the flow of processing for cancelling the low-coast flag F. The low-coast flag F is made 0 at step 308 if the range if found to be other than the D range at step 305, if the mode is found to be the H mode at step 306, or if the accelerator opening $\theta$ is found to be greater than the coasting decision throttle opening $\theta i$ at step 307.

Figure 27:
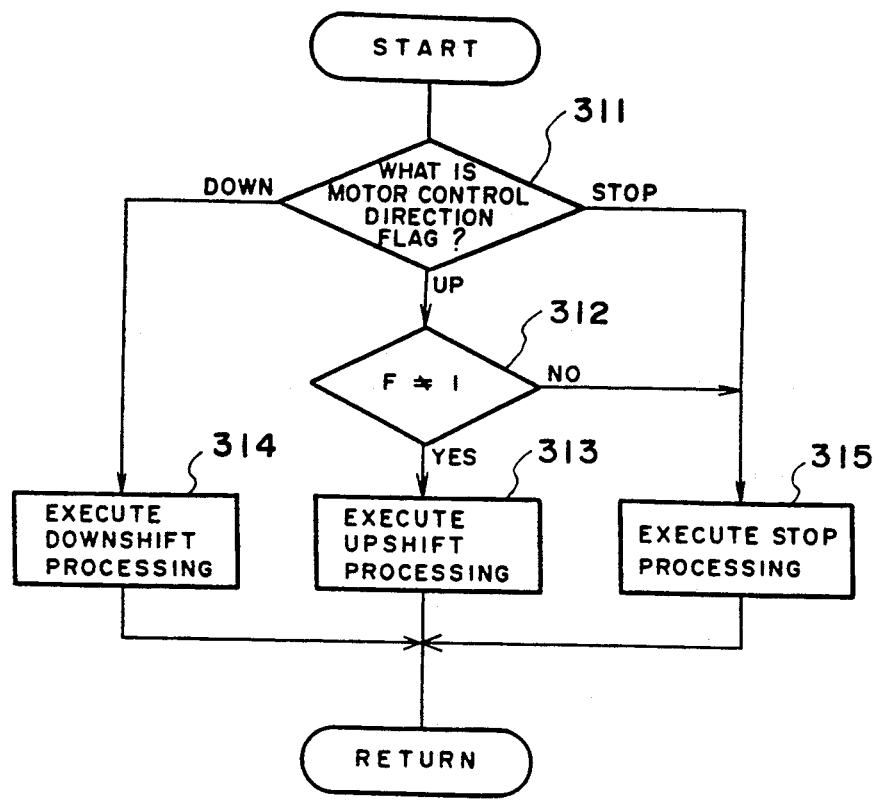

As shown in FIG. 27, it is determined at step 311 whether the motor control direction flag is indicative of stop, the up direction or the down direction. Motor stopping processing, upshift processing and downshift processing is executed through steps 313-315 based on the decision of step 311. In the case of upshift processing, it is determined at step 312 whether the low-coast flag F is not 1. If the flag F is found to be 1, namely if the accelerator opening $\theta$ is zero or near zero in the D range, the program proceeds to step 315 and the motor is stopped.

Figure 28:
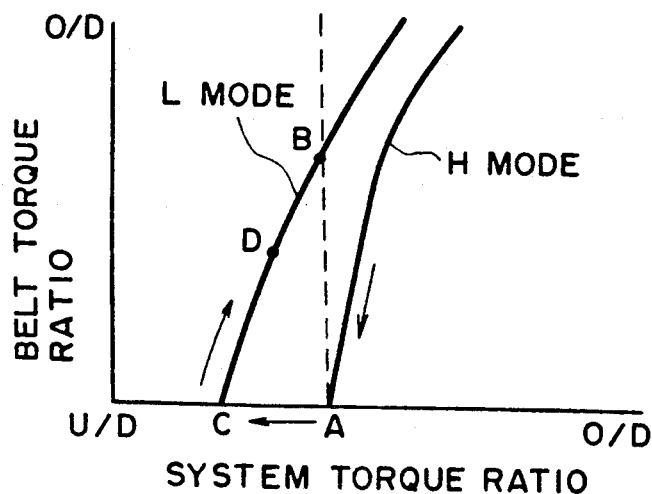
FIG. 28 is a view for describing operation at the time of coasting.

This will be described in greater detail with reference to FIG. 28. As vehicle speed decreases at coast down in the H mode of the D range, the target torque ratio changes and becomes a torque ratio which can be attained only in the L mode (the change from point A to point B in FIG. 28). When a changeover is made from the H mode to the L mode (a changeover from point A to point C), the stepless transmission mechanism proceeds from step 312 to step 315 in FIG. 27 so that an underdrive state (point C) is maintained without an upshift (from point C to point B). The motor is stopped at the position with the maximum torque ratio. When the vehicle stops at this status, the carrier (9c) of the single planetary gear unit shown in FIG. 2 stops. As a result, the rotation of the secondary shaft (6a) of the stepless transmission mechanism (6) is transmitted to sun gear (9s), and it is stopped in the neutral state by free rotation of the one-way clutch F. When the accelerator pedal is depressed under these conditions (e.g., when the target becomes the point D), the stepless transmission mechanism performs an upshift (from point C to point D) so that the actual torque ratio is made to immediately coincide with the target torque ratio.

Accordingly, stopping is achieved in the neutral state at coast down in the H mode of the D range, thus making it possible to enhance the feeling of speed reduction. Furthermore, since the torque ratio of the stepless transmission mechanism attains the maximum value at a comparatively high speed at the time of coast down, the maximum torque ratio is attained in reliable fashion even after the vehicle is brought to a sudden stop. This makes it possible to start the vehicle moving forward again smoothly. In addition, if the accelerator pedal is depressed at coast down, smooth accelerability can be obtained without failure to acquire driving force and without detracting from comfort by making a violent downshift.

Figure 29:
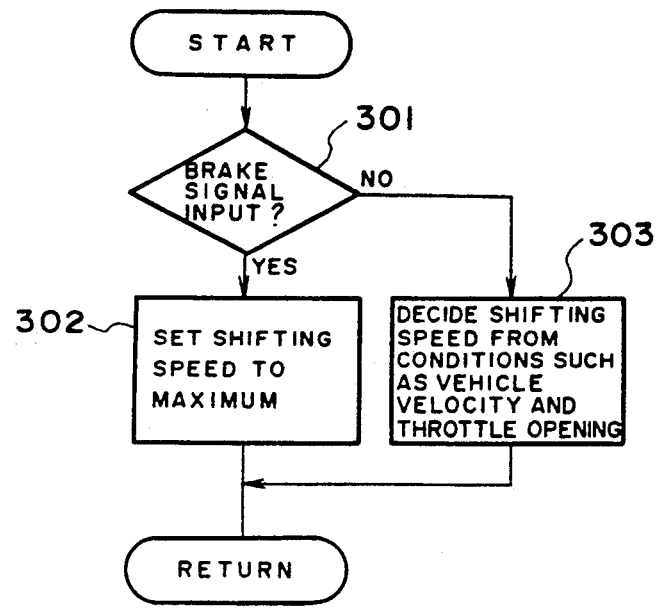
FIG. 29 is a flowchart of shifting speed control.

FIG. 29 is a flowchart illustrating the shift speed control of step 273 in FIG. 16. This control is a characterizing feature of the invention.

Figure 30:
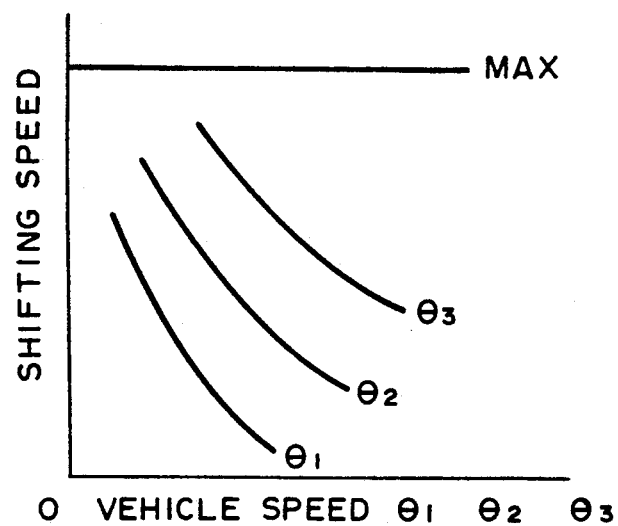
FIG. 30 is a view for describing the operation of shifting speed control.

It is determined at a step 301 whether there is input of the brake signal. If the brake signal arrives, the shift speed is set to the maximum speed (MAX in FIG. 30) at step 302. In the absence of the brake signal, the shift speed is decided by such traveling conditions as vehicle speed and throttle opening. Accordingly, the shift is capable of following up a sudden change in the target torque ratio caused by stepping down on the brake, and the shift can be terminated completely at an underdrive position when the vehicle is stopped. As a result, the vehicle can be started moving forward reliably the next time since the belt torque ratio attains the maximum torque ratio when the vehicle is stopped.

Figure 31:
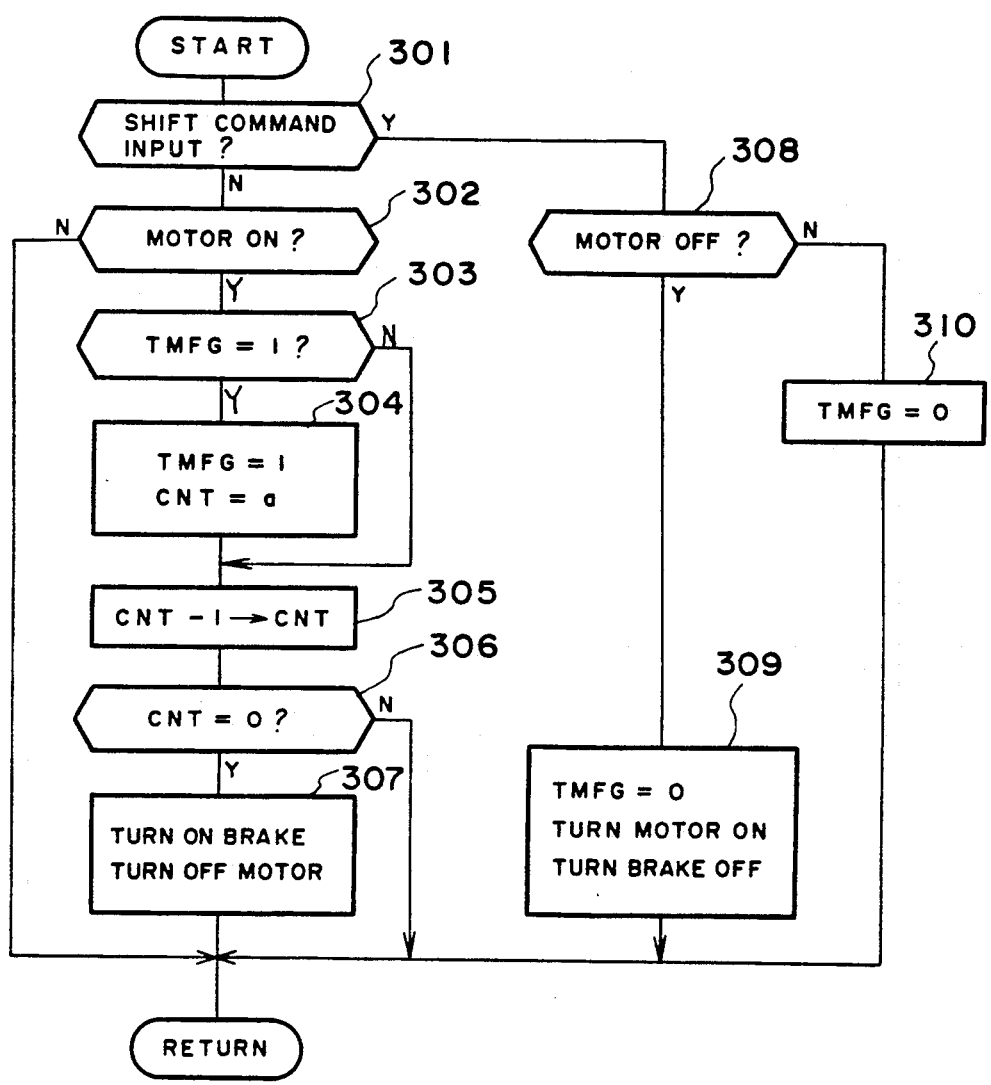
FIG. 31 is a flowchart of monitoring processing when stopping the motor.

FIG. 31 shows part of the flow in the motor control processing of step 268 in FIG. 16. This control is a characterizing feature of the invention.

Step 301 in FIG. 31 calls for a determination as to whether a shift command has been issued. If the answer at this step is YES, it is determined at step 308 whether the motor is off. If the answer is YES, then the program proceeds to step 309, where a timing flag is set to 0, the motor is turned on and the brake is turned off. If the motor is found to be on at step 308, then the timing flag is set to 0 at step 310. If it is found at the step 301 that a shift command has not been issued, it is determined at a step 302 whether the motor is on. The program returns if the motor is off. If the motor is on, it is determined at step 303 whether the timing flag is 1. The program proceeds to a step 305 is the timing flag is 1 and to a step 304 if the timing flag is not 1. At step 304 the timing flag is set to 1 and a constant a is set in a counter. Step 304 is followed by step 305, at which the counter is decremented. The processing of steps 302-306 is repeated until the count recorded in the counter becomes zero. When this occurs, the brake is turned on and the motor is turned off at a step 307.

Accordingly, if the stepless transmission mechanism shift command ends and the next shift command does not arrive even upon passage of a fixed period of time, the brake is turned on and the motor is turned off. Consequently, frequent application of the brake is avoided, thereby improving the durability of the brake. Since the brake is applied after the motor is stopped first, brake durability is enhanced so that it is possible to employ a brake having a small capacity.

Figure 32:
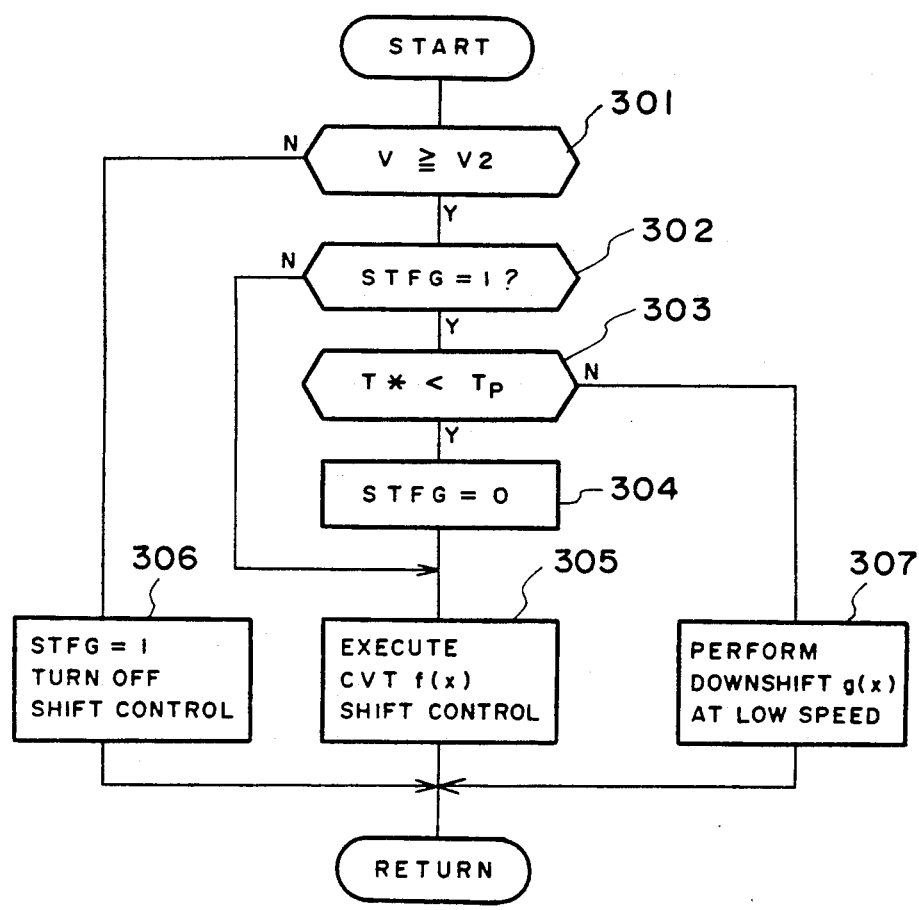
FIG. 32 is a flowchart of CVT control when the vehicle is stopped.

FIG. 32 is a flowchart of shift motor control, which is a characterizing feature of the invention.

Figure 33:
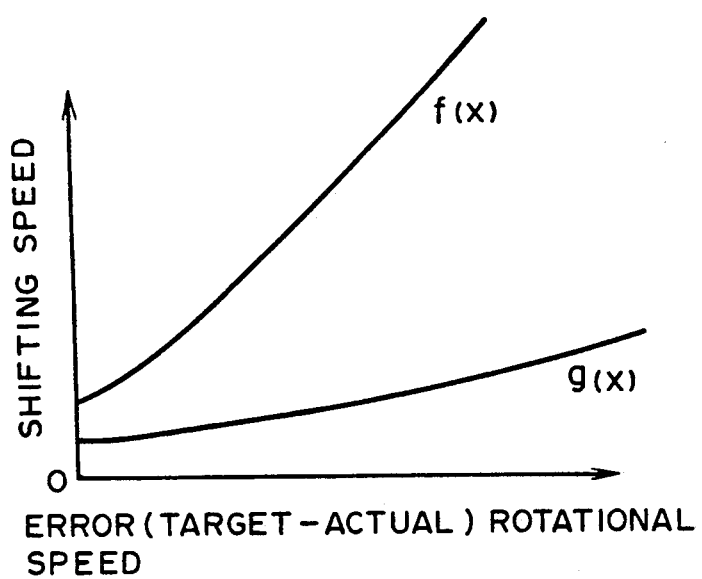
FIG. 33 is a view for describing the operation of motor control.

Step 301 in FIG. 32 calls for a determination as to whether actual vehicle speed V is equal to or greater than a speed (e.g., 5 km/h) at which CVT control is capable of starting. If the answer at step 301 is NO, a flag STFG, which is set when control is in the halted state, is set to 1 at a step 306. If the answer at step 301 is YES, it is determined at step 302 whether the flag STFG is 1. If this flag is found to be 0, the program proceeds to a step 305. If the flag is found to be 1, then it is determined at step 303 whether the target torque ratio T* is smaller than the present torque ratio $T_P$. If this is the case, the flag STFG is made 0 at step 304 and ordinary CVT shift control is performed at step 305. This control state is shown in FIG. 33. If it is determined at the step 303 that the target torque ratio T* is larger than the present torque ratio $T_P$, a downshift is performed at low speed at a step 307. It should be noted that the rotational speed of the primary or secondary sheave may be employed instead of the vehicle speed in step 301.

Accordingly, when the vehicle is stopped as by sudden braking and then is started moving forward again with the belt stopped midway, the stepless transmission mechanism performs a downshift at low speed so that the vehicle can be started moving forward again smoothly without shock.

Figure 34:
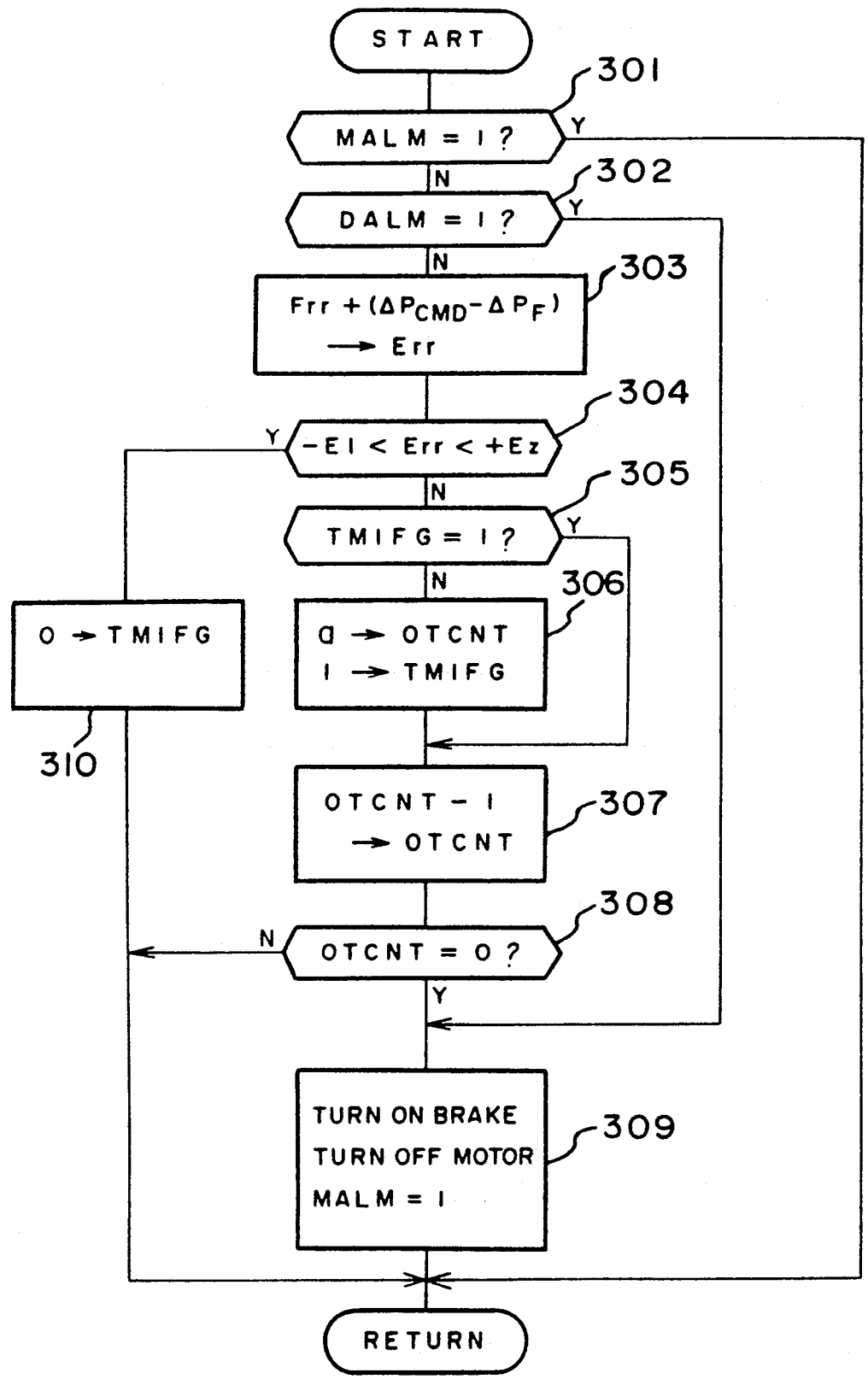
FIG. 34 is a flowchart of overtravel processing.
Figure 35:
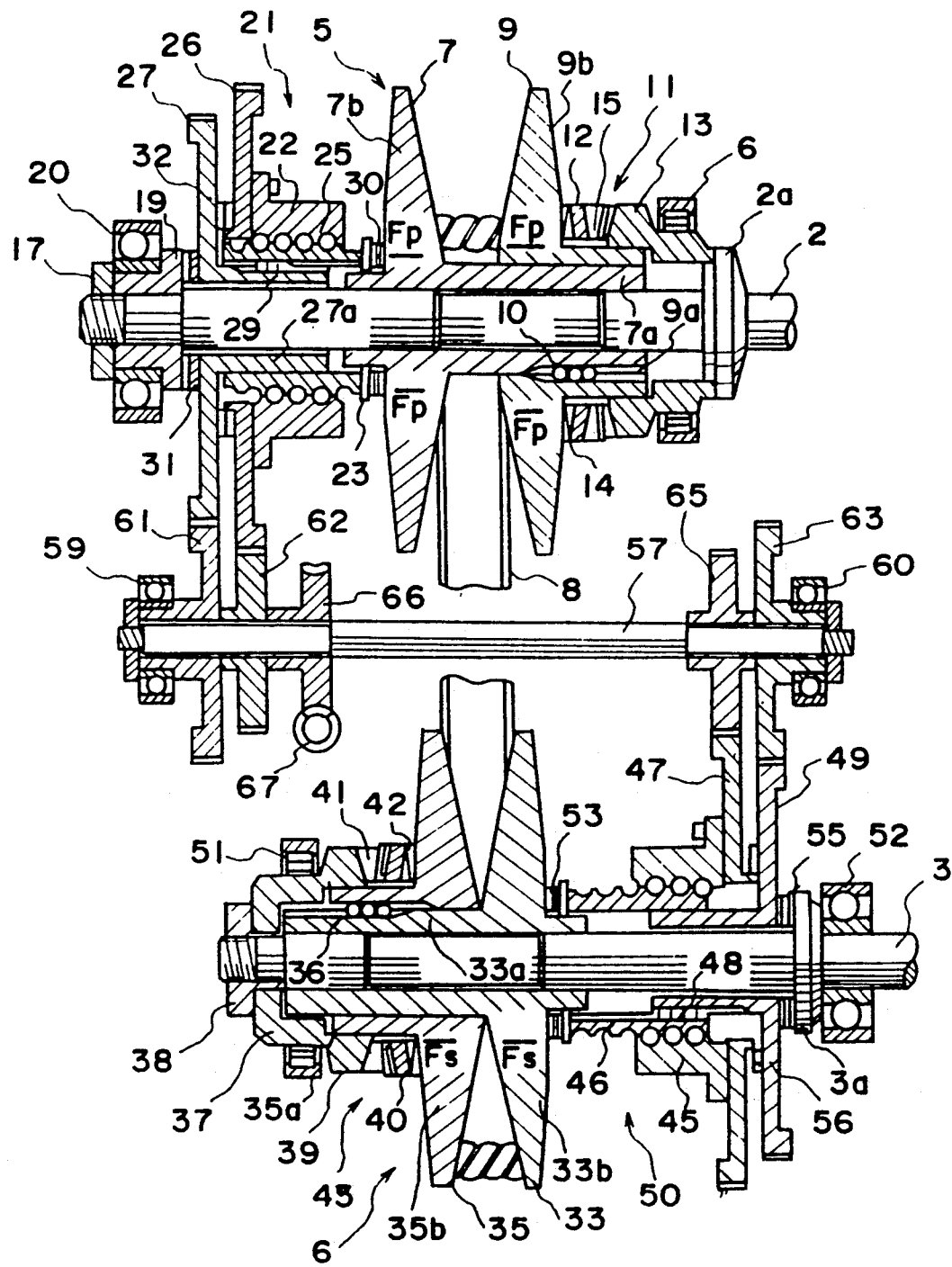
FIG. 35 is a sectional view showing an example of a stepless transmission according to the prior art.
Figure 36:
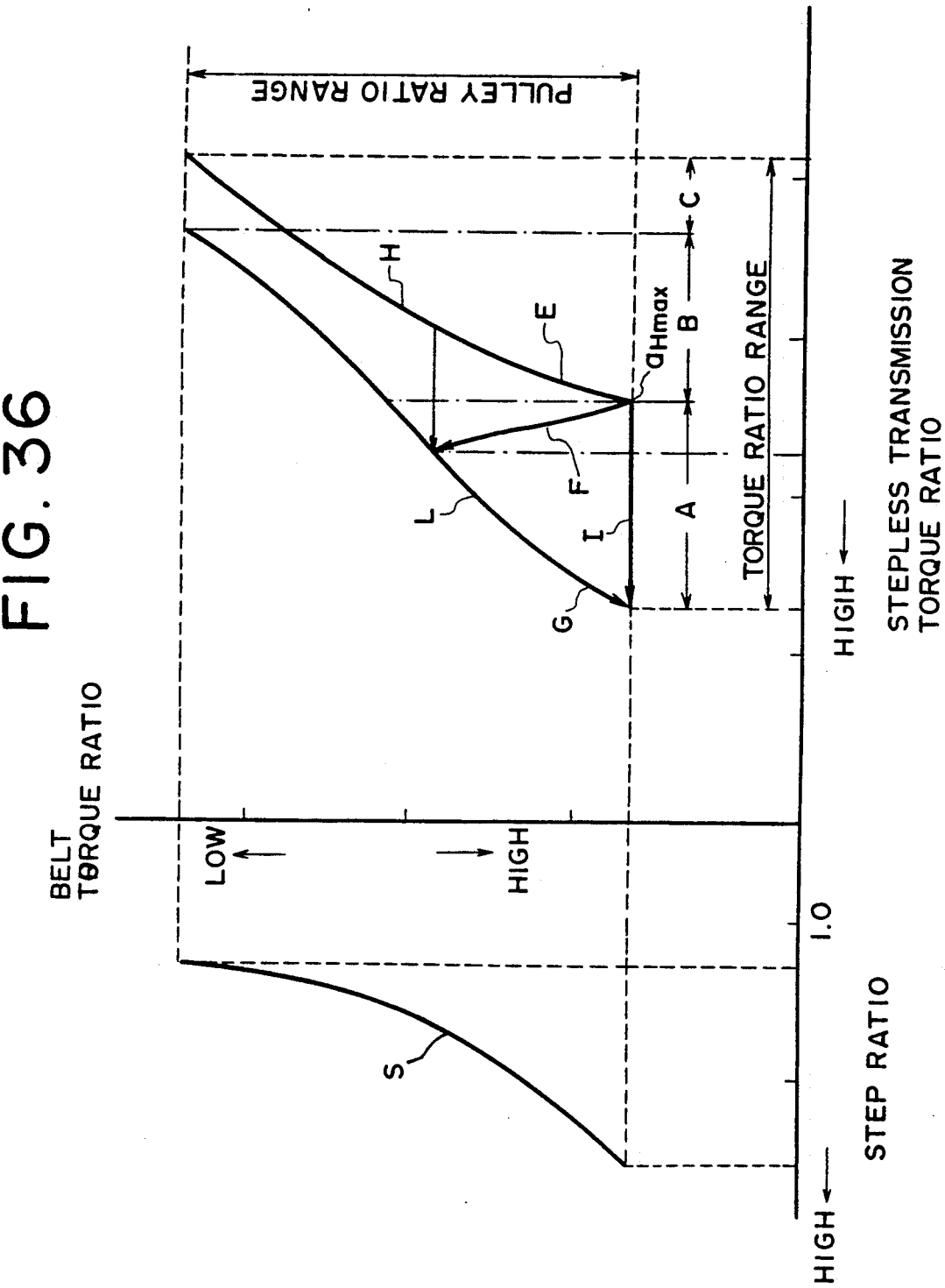
FIG. 36 is a view showing the relationship between step ratio and stepless transmission torque ratio, with respect to belt torque ratio.

FIG. 34 is a flowchart of the overtravel detection processing, which is a characterizing feature of the invention, of step 217 in FIG. 14.

This processing is executed every 100 msec, by way of example. First, it is determined at step 301 whether a flag MALM, which is set when the motor is regarded as having malfunctioned, is 1. If the answer is YES, the program returns and other processing is executed. If the answer is NO, it is determined at a step 302 whether an alarm signal DALM from the motor driver is 1. If the answer is YES at this step, the program proceeds to step 309, at which the brake is turned on, the motor is turned off and the flag MALM is set to 1. In the absence of the alarm signal, the program proceeds from step 302 to step 303, at which the difference between the magnitude $\Delta P_{CMD}$ of a motor rotation command and the amount $\Delta P_F$ of rotational feedback from the motor is added to the magnitude Err of the last error, thereby updating this value to a new error magnitude Err. In other words, the error magnitude Err does not change if the number of pulses serving as the command magnitude $\Delta P_{CMD}$ and the number of pulses serving as the amount of feedback are equal.

Next, it is determined at step 304 whether the error Err lies between an upper limit value +E2 and a lower limit value −E1. If Err lies between these limits, a timing flag TM1FG is set to 0 at step 310 and the program returns. If the error Err is not within these limits, it is determined at step 305 whether the timing flag TM1FG is 1. If the answer is YES, the program processed to step 307; if the answer is NO, the program proceeds to a step 306, at which a constant a is set in an overtravel counter OTCNT and, at the same time, the timing flag TM1FG is set to 1. The overtravel counter OTCNT is decremented at the step 307, after which it is determined at step 308 whether the overtravel counter OTCNT is 0. If OTCNT is 0, the program proceeds to a step 309, at which the brake is turned on, the motor is turned off and the flag MALM is set to 1. In other words, in accordance with the processing of steps 304-309, if the error Err continues to be outside certain limits for a period of time greater than a fixed period of time, then the motor is deemed to be uncontrollable, the brake is turned on and the motor is turned off.

Accordingly, whether or not the motor is uncontrollable can be determined in reliable fashion. If the motor is found to be uncontrollable, the brake is turned on and the motor is turned off, thereby making it possible to fix the torque ratio and eliminate impaired vehicle travel.

As many apparently widely different embodiments of the present invention can be made without departing from the spirit and scope thereof, it is to be understood that the invention is not limited to the specific embodiments thereof except as defined in the appended claims.

What we claim is:

1. A control system for a stepless transmission unit, comprising:
   stepless transmission means for variably controlling torque ratio in a stepless manner,
   stepless transmission operating means for variably controlling said torque ratio of said stepless transmission means,
   auxiliary transmission means combined with said stepless transmission means and having a low-speed mode in which a shift control-enable region becomes a comparatively high torque ratio region and a high-speed mode in which a shift control-enable region becomes a comparatively low torque ratio region,
   mode changeover means for changing said auxiliary transmission means between said low-speed and high-speed modes,
   torque ratio detecting means for detecting torque ratio of said stepless transmission means, and target torque ratio setting means for setting a target torque ratio based upon a traveling condition of a vehicle, shift decision means, having a stepless shift decision means and a mode changeover decision means, for outputting signals to said stepless shift operating means and said mode changeover means based upon signals received from said torque ratio detecting means and said target torque ratio setting means, stop control decision means for determining whether a stop control state is in effect by detecting said traveling condition, means for stopping operation of said stepless transmission operating means based upon signals from said stop control decision means when a shift region is changed while downcoating, and means for setting output of said auxiliary transmission means to a neutral state.

2. A control system according to claim 1, wherein said stop control decision means issues signals when an accelerator opening of said vehicle is zero or near zero in D range.

3. A control system for a stepless transmission unit, comprising:

stepless transmission means for variably controlling torque ratio in a stepless manner, stepless transmission operating means for variably controlling said torque ratio of said stepless transmission means, auxiliary transmission means combined with said stepless transmission means and having a low-speed mode in which a shift control-enable region becomes a comparatively high torque ratio region and the high-speed mode in which a shift control-enable region becomes a comparatively low torque ratio region, mode changeover means for changing said auxiliary transmission means between said low-speed and high-speed modes, torque ratio detecting means for detecting torque ratio of said stepless transmission means, and target torque ratio setting means for setting a target torque ratio based upon a traveling condition of a vehicle, shift decision means, having a stepless shift decision means and a mode changeover decision means, for outputting signals to said stepless shift operating means and said mode changeover means based upon signals received from said torque ratio detecting means and said target torque ratio setting means, means for calculating transmission shift speed of said stepless transmission operating means, means for detecting a brake signal, and means for setting said transmission shift speed to a maximum speed when said brake signal is detected and setting said transmission shift speed according to the signals detecting said travelling condition of said vehicle when said brake signal is not detected.

4. A control system for a stepless transmission unit, comprising:

stepless transmission means for variably controlling torque ratio in a stepless manner, stepless transmission operating means for variably controlling said torque ratio of said stepless transmission means, auxiliary transmission means combined with said stepless transmission means and having a low-speed mode in which a shift control-enable region becomes a comparatively high torque ratio region and a high-speed mode in which a shift control-enable region becomes a comparatively low torque ratio region, mode changeover means for changing said auxiliary transmission means between said low-speed and high speed modes, torque ratio detecting means for detecting torque ratio of said stepless transmission means, and target torque ratio setting means for setting a target torque ratio based upon a traveling condition of a vehicle, shift decision means, having a stepless shift decision means and a mode changeover decision means, for outputting signals to said stepless shift operating means and said mode changeover means based upon signals received from said torque ratio detecting means and said target torque ratio setting means, means for calculating transmission shift speed of said stepless transmission operating means, and means for performing a downshift when said vehicle is started after a gear shift of said stepless transmission is stopped while shifting and when said target torque ratio is higher than a present torque ratio, and providing said transmission shift speed of said downshift at a speed lower than a normal downshift.

5. A control system for a stepless transmission unit, comprising:

stepless transmission means for variably controlling torque ratio in a stepless manner, motor means for variably controlling said torque ratio of said stepless transmission means, auxiliary transmission means combined with said stepless transmission means and having a low-speed mode in which a shift control-enable region becomes a comparatively high torque ratio region and a high-speed mode in which a shift control-enable region becomes a comparatively low torque ratio region, mode changeover means for changing said auxiliary transmission means between said low-speed and high-speed modes, torque ratio detecting means for detecting torque ratio of said stepless transmission means, and target torque ratio setting means for setting a target torque ratio based upon a traveling condition of a vehicle, shift decision means, having a stepless shift decision means and a mode changeover decision means, for outputting signals to said stepless shift operating means and said mode changeover means based upon signals received from said torque ratio detecting means and said target torque ratio setting means, braking means for stopping said motor when electric power is not connected to said motor, and means for operating said braking means when a predetermined time has elapsed after a shift command is completed by said shift decision means.

6. A control system for a stepless transmission unit, comprising:

stepless transmission means for variably controlling torque ratio in a stepless manner.

motor means for variably controlling said torque ratio of said stepless transmission means, auxiliary transmission means combined with said stepless transmission means and having a low-speed mode in which a shift control-enable region becomes a comparatively high torque ration region and a high-speed mode in which a shift control-enable region becomes a comparatively low torque ratio region, mode changeover means for changing said auxiliary transmission means between said low-speed and high-speed modes, torque ratio detecting means for detecting torque ratio of said stepless transmission means, and target torque ratio setting means for setting a target torque ratio based upon a traveling condition of a vehicle, shift decision means, having a stepless shift decision means and a mode changeover decision means, for outputting signals to said stepless shift operating means and said mode changeover means based upon signals received from said torque ratio detecting means and said target torque ratio setting means, braking means for braking said motor, deviation computing means for computing a difference between a target movement of said motor determined by said travelling condition of said vehicle and feedback of said target movement, and means for operating said braking means and for turning off said motor when said difference continues to be outside a predetermined range and for longer than a predetermined time.

* * * * *